US011620030B2

(12) United States Patent
Salowitz et al.

(10) Patent No.: US 11,620,030 B2
(45) Date of Patent: Apr. 4, 2023

(54) COHERENT GESTURES ON TOUCHPADS AND TOUCHSCREENS

(71) Applicant: Microsoft Technology Licensing, LLC, Redmond, WA (US)

(72) Inventors: Elizabeth Picchietti Salowitz, Kirkland, WA (US); Joseph Spencer King, Seattle, WA (US); Nan Yang, Bellevue, WA (US); Albert Peter Yih, Seattle, WA (US); Sharath Viswanathan, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/307,508

(22) Filed: May 4, 2021

(65) Prior Publication Data

US 2022/0357817 A1    Nov. 10, 2022

(51) Int. Cl.
*G06F 3/0481* (2022.01)
*G06F 9/451* (2018.01)
*G06F 3/0488* (2022.01)

(52) U.S. Cl.
CPC .......... *G06F 3/0481* (2013.01); *G06F 3/0488* (2013.01); *G06F 9/452* (2018.02); *G06F 2203/04104* (2013.01)

(58) Field of Classification Search
CPC ................ G06F 3/0481; G06F 3/0488; G06F 2203/04104
See application file for complete search history.

(56) References Cited

U.S. PATENT DOCUMENTS

| | | | |
|---|---|---|---|
| 2012/0210270 A1* | 8/2012 | Kwon | G06F 3/04883 715/777 |
| 2016/0048323 A1* | 2/2016 | Laubach | G06F 3/0235 345/173 |
| 2016/0085438 A1* | 3/2016 | Doan | G06F 3/04883 715/863 |
| 2021/0216176 A1* | 7/2021 | Walkin | G06F 3/04883 |

OTHER PUBLICATIONS

Bowden, Zac, "Windows 11 review: The start of a new era", Retrieved from: https://www.windowscentral.com/windows-10-sun-valley-features-everything-we-know, Oct. 4, 2021, 69 Pages.

* cited by examiner

*Primary Examiner* — Mong-Shune Chung

(57) ABSTRACT

In non-limiting examples of the present disclosure, systems, methods and devices for executing gesture operations are provided. A touchpad gesture manager and a touchscreen gesture manager may be maintained. Both managers may comprise the identities of gesture operations and conditions for executing the gesture operations. The conditions for one or more touchscreen gesture operations may be the same as the conditions for one or more corresponding touchpad gesture operations. The gestures that have same conditions for the touchscreen and the touchpad may comprise application window operations and virtual desktop transition operations. In some examples, one or more display elements, animations, or intermediate operations may be different in executing the touchscreen operations than for executing the touchpad operations.

20 Claims, 15 Drawing Sheets

COHERENT GESTURES ON TOUCHPADS AND TOUCHSCREENS

BACKGROUND

Touchscreens have become nearly ubiquitous across client computing devices (e.g., laptops, desktops, smart phones, tablets). Users of computing devices have been accustomed to initiating actions (e.g., shortcuts, gestures) on computing devices with keyboards and touchpads that have either not traditionally been available via touchscreen input, or that have different mechanisms of initiation.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the disclosure provide systems, methods, and devices for executing touchscreen gestures that have same or similar conditions of execution as their touchpad counterparts. According to a first example, a computer-readable storage device is provided. The computer readable storage device comprises executable instructions that, when executed by a processor, assist with executing gesture operations, the computer-readable storage device including instructions executable by the processor for: maintaining a touchpad gesture manager comprising: an identity of a touchpad gesture operation, a first condition of execution of the touchpad gesture operation, wherein the first condition of execution comprises an input of a number of digits on a touchpad, and a second condition of execution of the touchpad gesture operation, wherein the second condition of execution comprises a movement type of the number of digits in a same direction on the touchpad; and maintaining a touchscreen gesture manager comprising: an identity of a touchscreen gesture operation corresponding to the touchpad gesture operation, a first condition of execution of the touchscreen gesture operation, wherein the first condition of execution comprises an input of the number of digits on a touchscreen, and a second condition of execution of the touchscreen gesture operation, wherein the second condition of execution comprises the movement type of the number of digits in the same direction on the touchscreen.

According to an additional example, a computer-implemented method is provided. The computer-implemented method comprises: executing a first software application instance in a first application window and a second software application instance in a second application window, wherein the first application window is displayed at a top of a z-order of a user interface displayed on a touchscreen; receiving, by the touchscreen, a multi-digit touch input; determining that a number of digits that are in contact with the touchscreen is mapped to a first condition of execution of a touchscreen gesture operation; modifying, based on the determination that the number of digits that are in contact with the touchscreen is mapped to the first condition of the touchscreen gesture operation, a display property of the first application window and the second application window; determining a movement of the multi-digit touch input on the touchscreen; determining that the movement fulfills a second condition of execution of the touchscreen gesture operation; and executing the touchscreen gesture operation, wherein execution of the touchscreen gesture operation comprises causing the second application window to be displayed at the top of the z-order of the user interface.

According to an additional example, a system is provided. The system comprises: a memory for storing executable program code; and a processor, functionally coupled to the memory, the processor being responsive to computer-executable instructions contained in the program code and operative to: maintain a first virtual desktop and a second virtual desktop, wherein the first virtual desktop is currently displayed on a touchscreen; receive, by the touchscreen, a multi-digit touch input; determine that a number of digits that are in contact with the touchscreen is mapped to a first condition of execution of a touchscreen gesture operation; modify, based on the determination that the number of digits that are in contact with the touchscreen is mapped to the first condition of the touchscreen gesture operation, a display property of the first virtual desktop; determine a movement of the multi-digit touch input on the touchscreen; determine that the movement fulfills a second condition of execution of the touchscreen gesture operation; and execute the touchscreen gesture operation, wherein execution of the touchscreen gesture operation comprises causing a preview element of the second virtual desktop to be currently displayed on the touchscreen.

BRIEF DESCRIPTION OF THE DRAWINGS

Non-limiting and non-exhaustive examples are described with reference to the following figures.

DETAILED DESCRIPTION

Figure 1:
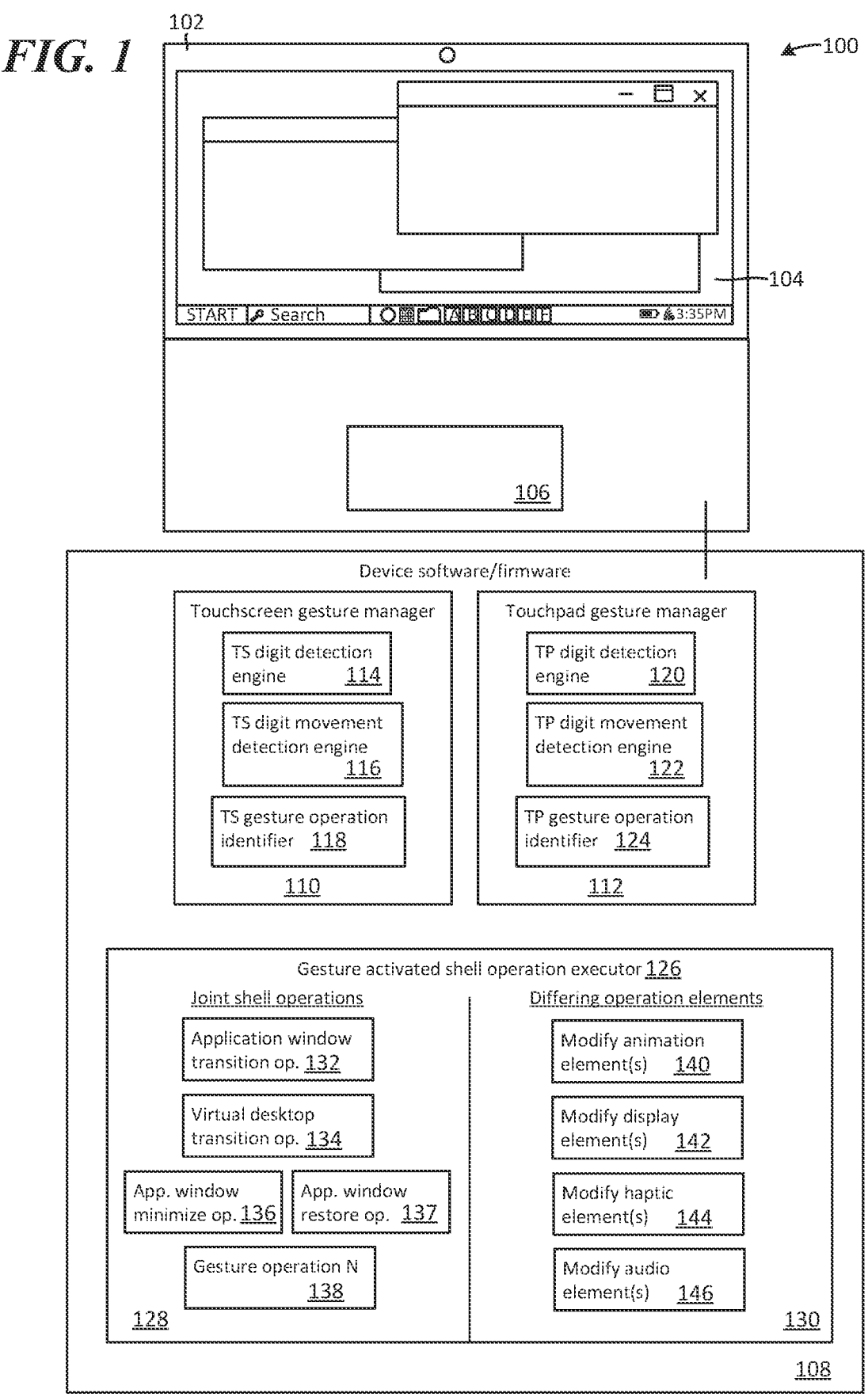
FIG. 1 is a schematic diagram illustrating an example computing environment for executing touchscreen gestures that have same conditions of execution as their touchpad counterparts.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Examples of the disclosure provide systems, methods, and devices for executing touchscreen gestures that have same or similar conditions of execution as their touchpad counterparts. As described herein, a "gesture" comprises an input of one or more digits (e.g., fingers, capacitive objects) on a touchpad or touchscreen, and a movement of the one or more digits on the touchpad or touchscreen.

In some examples, a computing device may maintain a touchscreen gesture manager. The touchscreen gesture manager may comprise the identities of one or more gesture operations that can be executed via one or more touchscreen gestures. The touchscreen gesture manager may also comprise a first condition for executing each of the touchscreen gestures, and a second condition for executing each of the touchscreen gestures. The first and second conditions may be same or different for each of the touchscreen gestures. In some examples, the first condition may comprise receiving an input of a specific number of digits concurrently on the touchscreen, and a second condition may comprise receiving a movement of the number of digits on the touchscreen in a specific direction and/or of a specific length. In some examples, a touchscreen gesture operation may comprise one or more intermediary operations, which may be executed upon determining that a condition of the touchscreen gesture operation has been satisfied.

In examples where the computing device includes or is connected to a touchpad, the computing device may also comprise a touchpad gesture manager. The touchpad gesture manager may comprise the identities of one or more gesture operations that can be executed via one or more touchpad gestures. The touchpad gesture manager may also comprise a first condition for executing each of the touchpad gestures, and a second condition for executing each of the touchpad gestures. The first and second conditions may be same or different for each of the touchpad gestures. In some examples, the first condition for one or more of the touchpad gestures may comprise the receiving, by the touchpad, of an input of a same number of digits as is required to be input on the touchscreen to satisfy the first condition of a same or similar touchscreen gesture. Similarly, the second condition for one or more of the touchpad gestures may comprise the receiving, by the touchpad, of a same input movement of the same number of digits as is required to be input on the touchscreen to satisfy the second condition of a same or similar touchscreen gesture. Like touchscreen gesture operations, touchpad gesture operations may comprise one or more intermediary operations, which may be executed upon determining that a condition of the touchpad gesture operation has been satisfied.

According to some examples, upon determining that a first condition of a touchscreen input has been satisfied, one or more elements displayed on the touchscreen may be modified to indicate that further input (e.g., an input completing a gesture) may affect those one or more elements. For example, if a determination is made that a first condition of an application window transition gesture operation has been satisfied, one or more display properties of one or more application windows may be modified. In another example, if a determination is made that a first condition of a virtual desktop transition operation has been satisfied, one or more display properties of a currently displayed desktop may be modified. As described herein, a "virtual desktop" comprises a unique set of applications, files, registry entries, settings, user interface layouts, and/or active application windows, which may be transitioned to on a computing device. Thus, a single computing device may maintain multiple virtual desktops that may each have a set of unique features, and users may switch to a virtual desktop that best fits the user's current context (e.g., switch to a virtual desktop with work applications and files when at work, switch to a personal virtual desktop with personal applications and files when at home).

The systems, methods, and devices described herein provide technical advantages for initiating gesture operations across touchpads and touchscreens. Users often have to learn different gestures for each of their devices, and even sometimes for the same device (e.g., 2-in-1 devices) depending on whether they are using the touchpad or the touchscreen. This steep learning curve makes it difficult for users to learn and remember gestures that accelerate the way they interact with computer systems. Aspects of the current disclosure enable the same gestures on the touchscreen as already exist on the touchpad. This enables users to leverage already-learned patterns to help them interact with touchscreens in new but also familiar ways. In some examples, memory costs associated with maintaining different gesture identities and different gesture conditions may be reduced by having a single set of gestures and a single set of gesture conditions that apply across the touchscreen and the touchpad. Computing costs (e.g., CPU cycles) may also be reduced according to examples described herein, in that some gestures that previously required longer workflows can now be executed via simplistic gestures and processing of those gesture inputs. For example, rather than having to process multiple menu inputs and/or search commands from a touchscreen to switch virtual desktops, a simple two input touchscreen gesture may be utilized and processed (e.g., detecting a multi-digit input and a lateral movement of that multi-digit input on the touchscreen) to perform that same action.

FIG. 1 is a schematic diagram illustrating an example computing environment 100 for executing touchscreen gestures that have same conditions of execution as their touchpad counterparts. Computing environment 100 includes computing device 102 and device software/firmware 108. Computing device 102 is representative of a client computing device on which the mechanisms described herein may be practiced. Computing device 102 may comprise a laptop computing device, a tablet computing device, a desktop computing device, or a smart phone. Computing device 102 may or may not include an attached, or otherwise connected (e.g., wired connection, wireless connection), keyboard and/or touchpad. Computing device 102 includes touchscreen 104, which may receive touch inputs that may initiate the execution of touchscreen gesture operations. Computing device 102 also includes touchpad 106, which may receive touch inputs that may initiate the execution of touchpad gesture operations.

Device software/firmware 108 represents software and/or firmware that may be installed on, or otherwise accessed by, computing device 102. Device software/firmware 108 includes touchscreen gesture manager 110, touchpad gesture manager 112, and gesture activated shell operation executor 126.

Touchscreen gesture manager 110 includes touchscreen digit detection engine 114, touchscreen digit movement detection engine 116, and touchscreen gesture operation identifier 118. Touchscreen digit detection engine 114 may receive and register indications that touch inputs (e.g., finger touch inputs, stylus touch inputs) have been made to touchscreen 104. Touchscreen digit detection engine 114 may register a location on touchscreen 104 where a touch input is being made. If more than one touch input is received contemporaneously by touchscreen 104, touchscreen digit detection engine 114 may register the number of touch inputs that are being contemporaneously received in addition to their locations on touchscreen 104.

Touchscreen digit movement detection engine 116 may receive and register indications that touch inputs to touchscreen 104 have moved. Touchscreen digit movement detection engine 116 may register a location on touchscreen 104 where a touch input began, a location on touchscreen 104 where a touch input ended, and/or locations where a touch input moved from a starting location of touchscreen 104 to an end location of touchscreen 104. If more than one touch input is received contemporaneously by touchscreen 104, touchscreen digit movement detection engine 116 may register the start, end, and movement areas on touchscreen 104 where the touch inputs were received and moved to. Thus, touchscreen digit movement detection engine 116 may register a direction of movement of one or more touch inputs on touchscreen 104, a distance of movement on touchscreen 104 of one or more touch inputs, and a speed of movement on touchscreen 104 of one or more touch inputs.

Touchscreen gesture operation identifier 118 may comprise the identity of one or more touchscreen gesture operations that maybe initiated via one or more touch inputs and/or touch movements on touchscreen 104, as well as one or more conditions for executing the one or more touchscreen gesture operations. In some examples, touchscreen gesture operation identifier 118 may include identities of touchscreen gesture operations that have a corresponding touchpad gesture operation included in touchpad gesture operation identifier 124. That is, the identity of touchscreen gesture operations in touchscreen gesture operation identifier 118 may have same or similar conditions for executing a same or similar gesture operation via touchpad 106. Examples of touchscreen gesture identities included in touchscreen gesture manager 110 include, but are not limited to, an application window transition operation, a virtual desktop transition operation, an application window minimization operation, and an application window restore operation. In some examples, a gesture operations may comprise one or more intermediary operations. Additional details relating to the touchscreen operations and execution conditions associated with the touchscreen operations are provided below in relation to FIG. 2.

Touchscreen gesture manager 110 may determine whether one or more conditions for execution of one or more touchscreen gesture operations have been met. If a determination is made that one or more conditions for execution of one or more touchscreen gestures have been met, touchscreen gesture manager 110 may send a notification to gesture activated shell operation executor 126 that the one or more conditions for execution of the one or more touchscreen gestures have been met. In some examples, the notification may include the identity of the one or more gesture operations for which execution conditions have been met. Some touchscreen gesture operations may include a set of intermediary operations and each of the intermediary operations in a set may have a distinct condition of execution. Thus, in some examples, touchscreen gesture manager 110 may determine whether one or more conditions for execution of one or more intermediary operations for a touchscreen gesture have been met. If a determination is made that one or more conditions for execution of one or more intermediary operations for a touchscreen gesture have been met, touchscreen gesture manager 110 may send a notification to gesture activated shell operation executor 126 that the one or more conditions have been met. In some examples, the notification may include the identity of the one or more intermediary operations.

Touchpad gesture manager 112 includes touchpad digit detection engine 120, touchpad digit movement detection engine 122, and touchpad gesture operation identifier 124. Touchpad digit detection engine 120 may receive and register indications that touch inputs (e.g., finger touch inputs, stylus touch inputs) have been made to touchpad 106. Touchpad digit detection engine 120 may register a location on touchpad 106 where a touch input is being made. If more than one touch input is received contemporaneously by touchpad 106, touchpad digit detection engine 120 may register the number of touch inputs that are being contemporaneously received in addition to their locations on touchpad 106.

Touchpad digit movement detection engine 122 may receive and register indications that touch inputs to touchpad 106 have moved. Touchpad digit movement detection engine 122 may register a location on touchpad 106 where a touch input began, a location on touchpad 106 where a touch input ended, and/or locations where a touch input moved from a starting location of touchpad 106 to an end location of touchpad 106. If more than one touch input is received contemporaneously by touchpad 106, touchpad digit movement detection engine 122 may register the start, end, and movement areas on touchpad 104 where the touch inputs were received and moved to. Thus, touchpad digit detection engine 122 may register a direction of movement of one or more touch inputs on touchpad 106, a distance of movement on touchpad 106 of one or more touch inputs, and a speed of movement on touchpad 106 of one or more touch inputs.

Touchpad gesture operation identifier 124 may comprise the identity of one or more touchpad gesture operations that may be initiated via one or more touch inputs and/or touch movements on touchpad 106, as well as one or more conditions for executing the one or more touchpad gesture operations. In some examples, touchpad gesture operation identifier 124 may include identities of touchpad gesture operations that have a corresponding touchscreen gesture operation included in touchscreen gesture operation identifier 118. That is, the identity of touchpad gesture operations in touchpad gesture operation identifier 124 may have same or similar conditions for executing a same or similar gesture operation via touchscreen 104. Examples of touchpad gesture identities included in touchpad gesture operation identifier 124 include, but are not limited to, an application window transition operation, a virtual desktop transition operation, an application window minimization operation, and an application window restore operation. Additional details relating to the touchpad operations and execution conditions associated with the touchpad operations are provided below in relation to FIG. 2.

Touchpad gesture manager 112 may determine whether one or more conditions for execution of one or more touchpad gesture operations have been met. If a determination is made that one or more conditions for execution of one or more touchpad gestures have been met, touchpad gesture manager 112 may send a notification to gesture activated shell operation executor 126 that the one or more conditions for execution of the one or more touchpad gestures have been met. In some examples, the notification may include the identity of the one or more gesture operations for which execution conditions have been met. Some touchpad gesture operations may include a set of intermediary operations and each of the intermediary operations may have a distinct condition of execution. Thus, in some examples, touchpad gesture manager 112 may determine whether one or more conditions for execution of one or more intermediary operations for a touchpad gesture have been met. If a determination is made that one or more conditions for execution of one or more intermediary operations for a touchpad gesture have been met, touchpad gesture manager 112 may send a notification to gesture activated shell operation executor 126 that the one or more conditions have been met. In some examples, the notification may include the identity of the one or more intermediary operations.

Gesture activated shell operation executor 126 includes joint shell operations 128 and differing operation elements 130. Joint shell operations 128 includes identities of gesture operations that have same or similar conditions of execution for touchpad 106 and touchscreen 104, as well as same or similar operations that may be performed once the conditions of execution are met. Joint shell operations 128 may additionally include instructions and/or application programming interfaces (APIs) for causing one or more operating system elements (e.g., shell elements, desktop elements, application window elements) to execute gesture operations upon receiving an indication that one or more conditions for execution have been met. In this example, joint shell operations 128 includes identities, instructions for executing, and/or APIs for application window transition operation 132, virtual desktop transition operation 134, application window minimization operation 136, application window restore operation 137, and one or more additional operations illustrated as gesture operation N 138.

Differing operation elements 130 includes various aspects of gesture operations that may differ between a touchscreen version of a gesture operation and a corresponding touchpad version of a gesture operation. For example, some of joint shell operations 128 may differ slightly in one or more ways in which the operation is executed, while having same conditions for initiation and execution. For example, different graphical animations may be played for one or more joint shell operations, as illustrated by modify animation element(s) 140; different display elements of one or more display objects (e.g., application windows, virtual desktops) may be rendered for one or more joint shell operations, as illustrated by modify display element(s) 142; different haptic feedback may be generated for one or more joint shell operations, as illustrated by modify haptic element(s) 144; and different audio output may be generated for one or more joint shell operations, as illustrated by modify audio element(s) 146.

Joint shell operations 128 may be executed differently on the touchscreen than for the touchpad to improve the user experience associated with interacting with a touchscreen. That is, users interact in a unique manner with touchscreens compared to the manner in which they interact with touchpads, and therefore there are different animation elements, display elements, haptic elements, and/or audio elements that may be executed in association with touchscreen initiated gesture operations, that improve the touchscreen experience compared with the touchpad initiated gesture operations. Additionally, touchscreens have additional properties (e.g., display properties) available to them that touchpads do not have, and those properties may be leveraged to improve the user experience associated with touchscreen gesture operations that are common to touchscreens and touchpads.

Gesture activated shell operation executor 126 may receive indications from touchscreen gesture manager 110 and touchpad gesture manager 112 that conditions for executing gesture operations have been met. Upon receiving an indication that conditions for executing a gesture operation have been met, gesture activated shell operation executor 126 may execute the gesture operation. As described above, the conditions for initiating and executing joint shell operations 128 are the same on touchpad 106 and touchscreen 104 (e.g., the same number of digit inputs needs to be detected on either the touchpad or the touchscreen, the same directional movement of the number of digit inputs needs to be detected on either the touchpad or the touchscreen), although the execution of those joint shell operations 128 may differ depending on the type of gesture operation that is being executed.

Figure 2:
FIG. 2 is a block diagram of a touchscreen gesture operation identifier, which may be included in a touchscreen gesture manager for a computing device, and a touchpad gesture operation identifier, which may be included in a touchpad gesture manager for a computing device.

FIG. 2 is a block diagram of a touchscreen gesture operation identifier 202, which may be included in a touchscreen gesture manager for a computing device, and a touchpad gesture operation identifier 228, which may be included in a touchpad gesture manager for a computing device. Touchscreen gesture operation identifier 202 may comprise the identity of one or more touchscreen gesture operations that may be initiated via one or more touch inputs and/or touch movements on a touchscreen, as well as one or more conditions for executing the one or more touchscreen gesture operations. In some examples, touchscreen gesture operation identifier 202 may include identities of touchscreen operations that have a corresponding touchpad gesture operation included in touchpad gesture operation identifier 228.

In this example, touchscreen gesture operation identifier 202 includes identities of four gesture operations that have same conditions for initiating and/or executing a gesture operation via the touchscreen as a corresponding gesture operation identified in touchpad gesture operation identifier 228, although the conditions for satisfying the gestures included in gesture operation identifier 228 would be met via touchpad input rather than touchscreen input. It should be understood that there may be more or fewer gesture operations that are included in touchscreen gesture operation identifier 202. The four touchscreen gesture operations included in touchscreen gesture operation identifier 202 are application window transition operation 204, virtual desktop transition operation 210, application window minimization operation 216, and application window restore operation 222.

Application window transition operation 204, when executed (e.g., when first condition 206 and second condition 208 are satisfied), may cause one or more application window previews of open (although not necessarily currently displayed) application windows to be displayed for selection. The application window previews may comprise live or static representations of the open application windows. In some examples, a most recently used application window may have its corresponding preview brought to a top of a z order of application window previews, and one or more application window previews may be ordered based on times that they were last interacted with or otherwise brought to the foreground. The application window previews may be graphically switched (e.g., a different window may be surfaced at the top of the z order) upon receiving a subsequent touchscreen interaction (e.g., a multi-digit lateral movement on the touchscreen). In some examples, selection of an application preview window may cause the corresponding application window to be surfaced and/or maximized on a user interface displayed on the touchscreen.

Application window transition operation 204 includes first condition 206, and second condition 208. First condition 206 may comprise a requirement that the touchscreen receive a touch input of a specific number of digits (e.g., three digits, two digits). Second condition 208 may comprise a requirement that the touchscreen receive a movement of the specific number of digits in a lateral direction on the touchscreen. In some examples, the lateral movement of the specific number of digits may have to be of a threshold distance. The threshold distance may be different depending on a size of the touchscreen. In some examples, upon receiving an indication that first condition 206 has been satisfied, gesture activated shell operation executor 126 may modify a display property of one or more open application windows to indicate to a user that a further input (e.g., an input that satisfies second condition 208) may affect one or more open application windows. In some examples, the display property modification may comprise shrinking one or more open application windows, highlighting one or more open application windows, adding a border to one or more open application windows, and/or coloring one or more open application windows. The modification of a display property of one or more open application windows may comprise an intermediary operation of application window transition operation 204.

Virtual desktop transition operation 210, when executed (e.g., when first condition 212 and second condition 214 are satisfied), may cause one or more virtual desktop previews to be displayed for selection. The virtual desktop previews may comprise live or static representations of virtual desktops executed by the computing device (e.g., computing device 102). In some examples, a most recently used virtual desktop may have its corresponding preview brought to a top of a z order of virtual desktop previews, and one or more virtual desktop previews may be ordered based on times they were last interacted with. The virtual desktop previews may be graphically switched (e.g., a different virtual desktop may be surfaced) upon receiving a subsequent touchscreen interaction (e.g., a multi-digit lateral movement on the touchscreen). In some examples, selection of a virtual desktop preview may cause the corresponding virtual desktop to be surfaced and/or maximized on a user interface displayed on the touchscreen.

Virtual desktop transition operation 212 includes first condition 212 and second condition 214. First condition 212 may comprise a requirement that the touchscreen receive a touch input of a specific number of digits (e.g., three digits, four digits). Second condition 214 may comprise a requirement that the touchscreen receive a movement of the specific number of digits in a lateral direction on the touchscreen. In some examples, the lateral movement of the specific number of digits may have to be of a threshold distance. The threshold distance may be different depending on a size of the touchscreen. In some examples, upon receiving an indication that first condition 212 has been satisfied, gesture activated shell operation executor 126 may modify a display property of the virtual desktop that is currently being executed to indicate to a user that a further input (e.g., an input that satisfies second condition 214) may affect one or more virtual desktops. In some examples, the display property modification may comprise shrinking the virtual desktop that is currently being executed and displayed, highlighting the virtual desktop that is currently being executed and displayed, adding a border to the virtual desktop that is currently being displayed, and/or coloring the virtual desktop that is currently being displayed. The modification of a display property of the virtual desktop that is currently being executed may comprise an intermediary operation of virtual desktop transition operation 210.

Application window minimization operation 216, when executed (e.g., when first condition 218 and second condition 220 are satisfied), may cause one or more application windows that are currently open to be minimized That is, each application window that is open, although not necessarily displayed, may be minimized upon execution of application window minimization operation 216.

Application window minimization operation 216 includes first condition 218 and second condition 220. First condition 218 may comprise a requirement that the touchscreen receive a touch input of a specific number of digits (e.g., two digits, three digits). Second condition 220 may comprise a requirement that the touchscreen receive a movement of the specific number of digits in a downward vertical direction on the touchscreen. In some examples, the downward vertical direction on the touchscreen may have to be of a threshold distance. The threshold distance may be different depending on the size of the touchscreen. In some examples, upon receiving an indication that first condition 218 has been satisfied, gesture activated shell operation executor 126 may modify a display property of one or more open application windows to indicate to a user that a further input (e.g., an input that satisfies second condition 220) may affect one or more open application windows. In some examples, the display property modification may comprise shrinking one or more open application windows, highlighting one or more application windows, adding a border to one or more open application windows, and/or coloring one or more application windows. The modification of a display property of one or more open application windows may comprise an intermediary operation of application window minimization operation 216.

Application window restore operation 222, when executed (e.g., when first condition 224 and second condition 226 are satisfied), may cause one or more minimized application windows to be restored. In some examples, each application window that was minimized may be restored to the position it previously occupied prior to being minimized. In other examples, each application window that was minimized may be restored to a fully maximized position, with a position in the z-order being determined based on a ranking. In some examples, the ranking may be based on time of last use (e.g., ordered based on a time that each window last held the foreground position). In other examples, the ranking may be based on a determined relevance to a current task that a user is working on with the computer executing the application windows.

Application window restore operation 222 includes first condition 224 and second condition 226. First condition 224 may comprise a requirement that the touchscreen receive a touch input of a specific number of digits (e.g., three digits, four digits). Second condition 226 may comprise a requirement that the touchscreen receive a movement of the specific number of digits in an upward vertical direction on the touchscreen. In some examples, the upward vertical movement of the specific number of digits may have to be of a threshold distance. The threshold distance may be different depending on the size of the touchscreen. In some examples, upon receiving an indication that first condition 224 has been satisfied, gesture activated shell operation executor may cause one or more application window preview elements corresponding to the minimized application windows to be surfaced. The one or more application window preview elements may comprise live or static versions of the application windows. The application window preview elements may have a smaller size than the size of the application windows prior to their minimization. In other examples, no application preview elements may be surfaced upon receiving the indication that first condition 224 has been satisfied. The modification of a display property of one or more open application windows may comprise an intermediary operation of application window restore operation 222.

Touchpad gesture operation identifier 228 may comprise the identity of one or more touchpad gesture operations that may be initiated via one or more touch inputs and/or touch movements on a touchpad, as well as one or more conditions for executing the one or more touchpad gesture operations. In this example, touchpad gesture operation identifier 228 includes the same gesture operations as are included in touchscreen gesture operation identifier 202. Specifically, touchpad gesture operation identifier includes application window transition operation 230, virtual desktop transition operation 236, application window minimization operation 242, and application window restore operation 248.

Application window transition operation 230 requires first condition 232 and second condition 234 to be performed prior to triggering its execution. First condition 232 is the same condition as first condition 206, except first condition 232 must be performed on the touchpad rather than the touchscreen. Similarly, second condition 234 is the same condition as second condition 208, except second condition 234 must be performed on the touchpad rather than the touchscreen. Once first condition 232 and second condition 234 are satisfied, gesture activated shell operation executor 126 may execute application window transition operation 230, which may comprise same or similar operations as those performed in relation to application window transition operation 204. In some examples, application window transition operation 230 may comprise the surfacing of application window preview elements for each open application window, rather than surfacing a single application window at a time, as may be the case with application window transition operation 204.

Virtual desktop transition operation 236 requires first condition 238 and second condition 240 to be performed prior to triggering its execution. First condition 238 is the same condition as first condition 212, except first condition 238 must be performed on the touchpad rather than the touchscreen. Similarly, second condition 240 is the same condition as second condition 214, except second condition 240 must be performed on the touchpad rather than the touchscreen. Once first condition 238 and second condition 240 are satisfied, gesture activated shell operation executor 126 may execute virtual desktop transition operation 236, which may comprise same or similar operations as those performed in relation to virtual desktop transition operation 210.

Application window minimization operation 242 requires first condition 244 and second condition 246 to be performed prior to triggering its execution. First condition 244 is the same condition as first condition 218, except first condition 244 must be performed on the touchpad rather than the touchscreen. Similarly, second condition 246 is the same condition as second condition 220, except second condition 246 must be performed on the touchpad rather than the touchscreen. Once first condition 244 and second condition 246 are satisfied, gesture activated shell operation executor 126 may execute application window minimization operation 242, which may comprise same or similar operations as those performed in relation to application window minimization operation 216.

Application window restore operation 248 requires first condition 250 and second condition 252 to be performed prior to triggering its execution. First condition 250 is the same condition as first condition 224, except first condition 250 must be performed on the touchpad rather than the touchscreen. Similarly, second condition 252 is the same condition as second condition 226, except second condition 252 must be performed on the touchpad rather than the touchscreen. Once first condition 250 and second condition 252 are satisfied, gesture activated shell operation executor 126 may execute application window restore operation 248, which may comprise same or similar operations as those performed in relation to application window restore operation 222.

Figure 3:
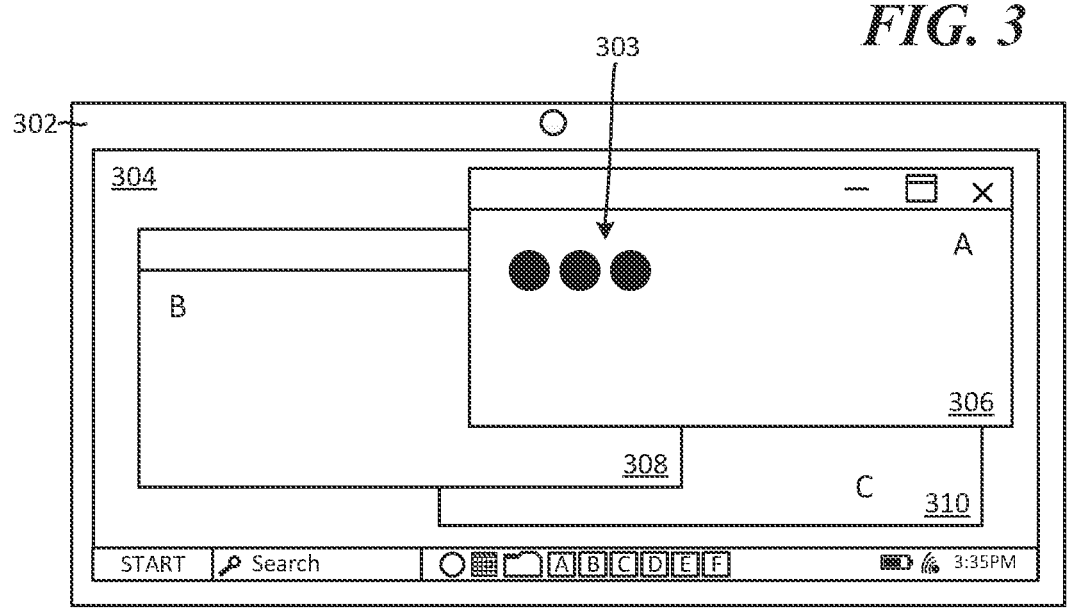
FIG. 3 illustrates the execution and display result of an application window transition gesture operation, which has been initiated via touch input on a touchscreen.
Figure 3:
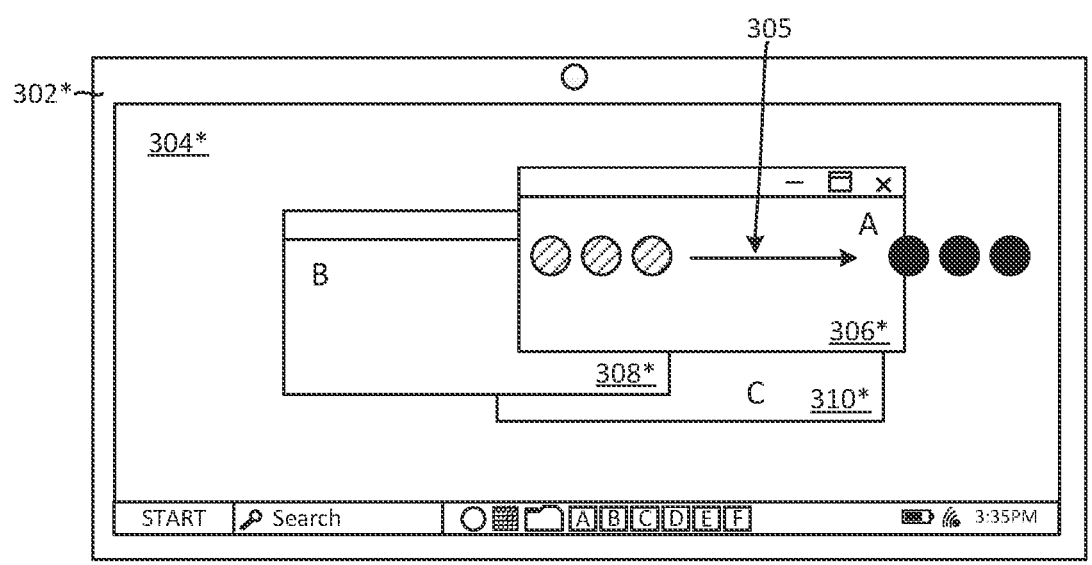
Figure 3:
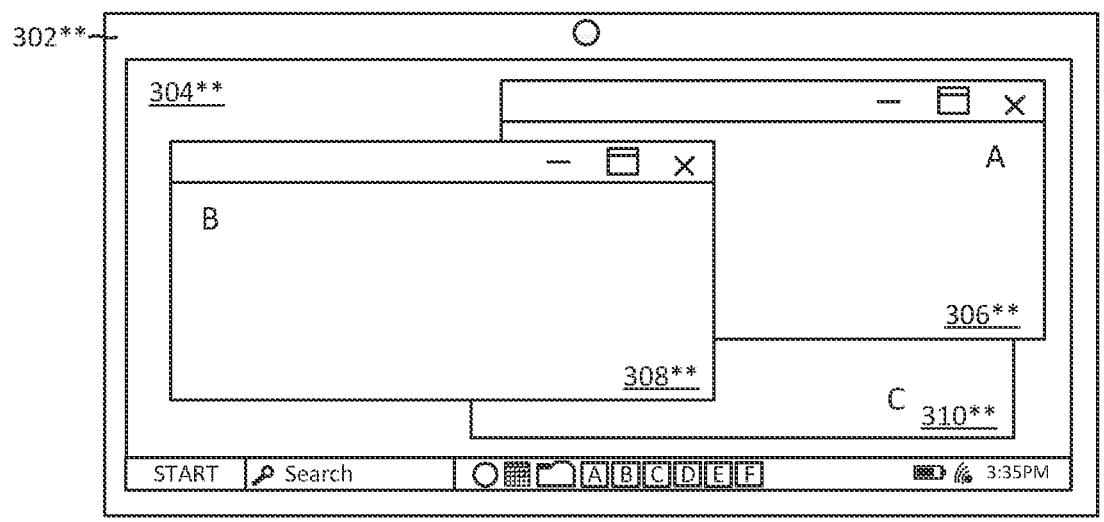

FIG. 3 illustrates the execution and display result of an application window transition gesture operation (e.g., application window transition operation 204), which has been initiated via touch input on a touchscreen. FIG. 3 includes computing device 302, 302\*, and **302\*\*, which are all the same computing device, displaying the results of an application window transition operation in an order in which they may occur (e.g., from computing device 302, to computing device 302\*, to computing device 302\*\*). Computing device 302 comprises a touchscreen computing device (e.g., the screen of computing device 302 can register touch inputs). In some examples, computing device 302 may comprise a laptop or other computing device that is connected to a touchpad. Computing device 302 may maintain a touchpad gesture manager comprising the identity of one or more touchpad gesture operations, and one or more conditions of execution for each touchpad gesture. Computing device 302 may additionally maintain a touchscreen gesture manager comprising an identity of one or more touchscreen gesture operations corresponding to the touchpad gesture operations, and one or more conditions of execution for each touchscreen gesture operation. In other examples, computing device 302 may comprise a computing device that is not connected to a touchpad, such as a tablet or smart phone. In still additional examples, computing device 302** may comprise a display that is connected to a computing device that executes a touchscreen gesture manager and/or a touchpad gesture manager.

Touchscreen 304 displays three application windows. Specifically, touchscreen 304 displays first application window 306, having a highest position in the z-stack; second application window 308, having a second highest position in the z-stack; and third application window 310, having the lowest position in the z-stack. In this example, a three digit input is received on touchscreen 304, as indicated by first touch input 303. The receiving of the three digit input satisfies the first condition of the application window transition operation. It should be understood that in some examples, the first condition of the application window transition operation may comprise the receiving of a touchscreen input of more or fewer digits (e.g., two digits, four digits).

Upon receiving first touch input 303 computing device 302* modifies a display property of each of the open application windows (e.g., first application window 306*, second application window 308*, and third application window 310*). In this specific example, the modification of the display property comprises rendering the open application windows in a smaller size. In some examples, the smaller sized application windows may comprise live or static renderings of the open application windows (e.g., application window preview elements). In other examples, the modification of the display property may comprise highlighting the application windows, adding a border to the application windows, and/or coloring the application windows. Other modifications that indicate a further input may affect the open application windows may be applied to the application windows and are within the scope of this application. In some examples, the positions of the application windows in a z-order of the user interface may be saved to memory. For example, prior to or upon receiving first touch input 303, computing device 302 may save to memory that first application window 306 has a highest position in the z-order, second application window 308 has a second highest position in the z-order, and third application window 310 has a third highest position in the z-order.

In this example, subsequent to the application windows being rendered in a smaller size, a lateral movement of the three digit input is received by touchscreen 304*, as indicated by second touch input 305. The lateral movement of the three digit input satisfies the second condition of the application window transition operations. In other examples, the second condition of the application window transition operations may only be fulfilled upon receiving the lateral movement of the correct number of digits (e.g., three digits) and the removal of those three digits from the touchscreen. In this example, second touch input 305 comprises a movement of the three digits on touchscreen 304* in the right direction. However, the second condition of the application window transition operation may be satisfied by a lateral movement of the three digit input in the left direction.

Upon the fulfillment of the second condition of the application window transition operation, the application windows are restored to their original sizes and the application window order in the z-stack is modified. Specifically, because second application window 308* was directly behind first application window 306* in the z-order when the gesture operation began, second application window 308 is brought to the top of the z-order, and first application window 306 is moved directly behind second application window 308, with third application window 310 remaining in the third position in the z-order. However, the original z-order of each of the application windows when the gesture operation began is maintained until input is received in one of the application windows to avoid getting stuck in a constant loop of switching between first application window 306 and second application window 308. That is, if an additional inputs are received that satisfy the first and second conditions of the application window transition gesture operation, the original z-order is analyzed, and third application window 310** would be brought to the front of the z-order as more fully illustrated and described in relation to FIG. 4. Only upon receiving input in one of the application windows is the z-order refreshed in memory.

In this example, although application preview elements are illustrated as being rendered and displayed for all three application windows, in other examples, only one application window preview element may be displayed at a time during execution of the application window transition operation. Thus, in one example, when first touch input 303 is received only a single application preview element corresponding to first application window 306* may be displayed. In another example, when second touch input 305 is received, only second application window preview element 308** may be displayed. Additionally, in some examples, rather than restoring the application windows to their original size upon the second condition of the gesture operation being fulfilled as illustrated, the application windows may be rendered in their modified form (e.g., smaller application window previews) until a touch input is received on one of the application windows in their modified form.

Figure 4:
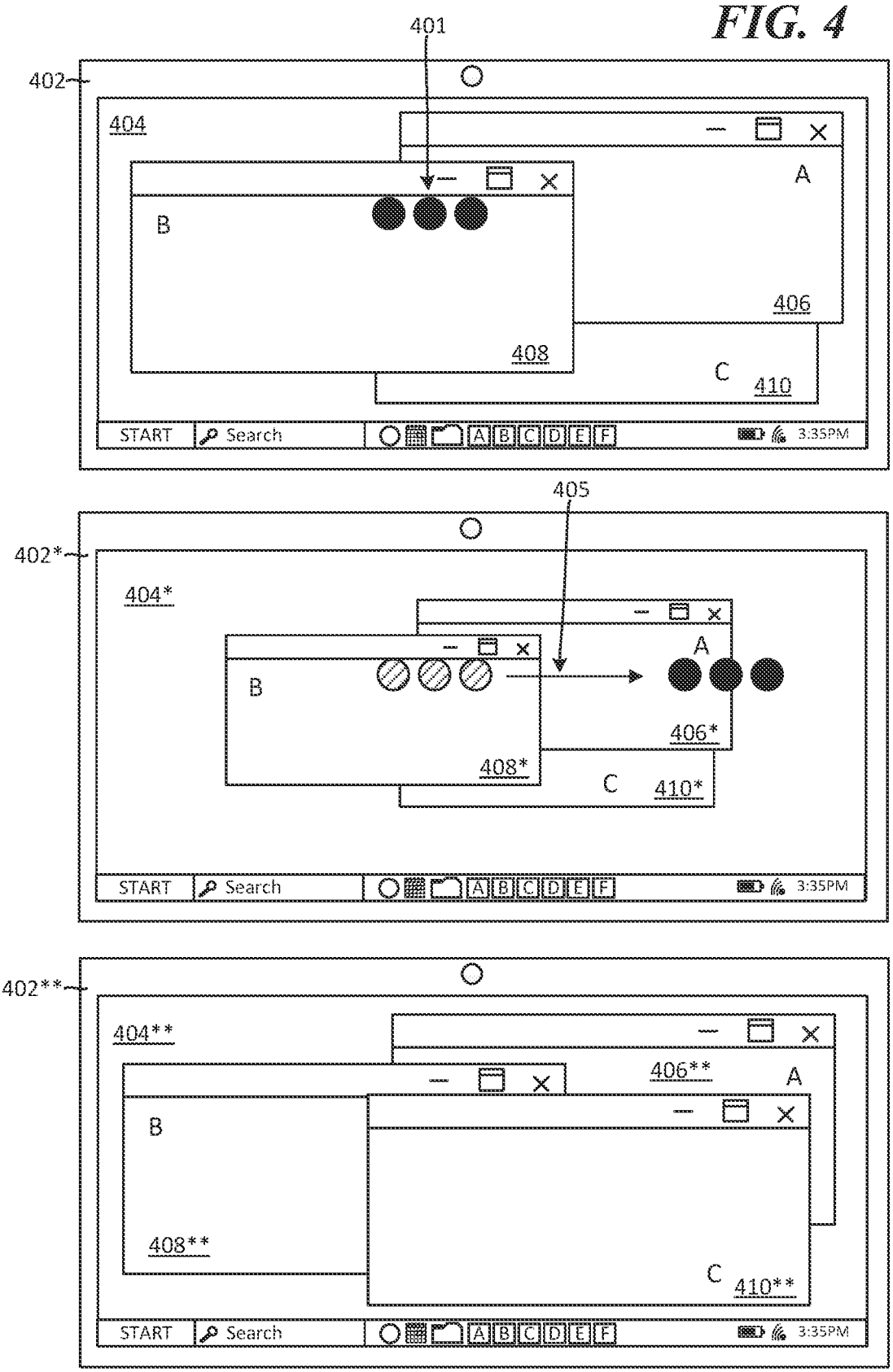
FIG. 4 illustrates the execution and display result of an additional touchscreen gesture input on the application preview elements surfaced via execution of the application window transition gesture operation of FIG. 3.

FIG. 4 illustrates the execution and display result of an additional touchscreen gesture input on the application preview elements surfaced via execution of the application window transition gesture operation of FIG. 3. Computing device 402 is the same computing device as computing device 302. In this example, the first and second conditions of the application window transition have been fulfilled, which has resulted in second application window 408 being displayed at the top of the z-order. In this example, first application window 406 is displayed directly behind second application window 408, and third application window 410 is displayed directly behind first application window 406.

In this example, touch input 401 is received. Touch input 401 comprises the receiving of a number of digits which meets the first condition of execution of the application window transition gesture operation. In this example the number of digits needed to fulfill the first condition is three digits. However, in other examples the number of digits may be more or fewer. Upon the first condition of execution being fulfilled computing device 402* modifies a display element of each of the application windows to indicate that a further input (e.g., an input that completes the gesture) may affect one or more of the application windows. This is illustrated by the modified display size of each of second application window 408* at the top of the z-order, first application window 406* at the second position in the z-order, and third application window 410* at the third position in the z-order. It should be understood that other modifications may be made to the application windows upon fulfillment of the first condition of execution for the gesture. For example, the application windows may highlighted, receive a bold outline, or be rendered in a different color.

A lateral movement of the three digit input is received by touchscreen 402*, as indicated by second touch input 405. The lateral movement of the three digit input satisfies the second condition of the application window transition operations. In this example, second touch input 405 comprises a movement of the three digits on touchscreen 402* in the right direction. However, the second condition of the application window transition operation may be satisfied by a lateral movement of the three digit input in the left direction. In additional examples, the second condition of the application window transition operations may only be satisfied upon receiving the lateral swipe of the correct number of digits (e.g., three digits) and the removal of those three digits from the touchscreen.

Upon fulfillment of the second condition of the application window transition operation, the application windows are restored to their original size and reordered. Specifically, the original z-order that was saved to memory (e.g., the z-order when touch input 303 was received in FIG. 3) corresponding to first application window 306 having a first position in the z-order, second application window 308 having a second position in the z-order, and third application window 310 having a third position in the z-order, is analyzed. A determination is made based on that original z-order that third application window 410 was originally directly behind second application window 408. As such, third application window 410 is caused to be rendered at the top of the z-order on touchscreen 404, second application window 408 is caused to be rendered directly behind third application window 410 in the z-order, and first application window 406 is caused to be rendered directly behind second application window 408 in the z-order. If an input is received on third application window 410, such as a single digit touch input, a text input, or a mouse click, the z-order may be updated in memory. If no such input is received to update the z-order in memory, and the gesture operation is performed again on the application windows displayed on computing device 402, first application window 406 would be rendered at the top of the z-order. However, if an input is received to update the z-order in memory (e.g., C first position, B second position, A third position), and the gesture operation is performed again on the application windows displayed on computing device 402, second application window 408** would be rendered at the top of the z-order.

In this example, although application preview elements are illustrated as being rendered and displayed for all three application windows, in other examples, only one application window preview element may be displayed at a time during execution of the application window transition operation. That is, in some examples, only the application window preview element that is currently at the top of the z-order may be displayed during execution of the application window transition operations.

Figure 5:
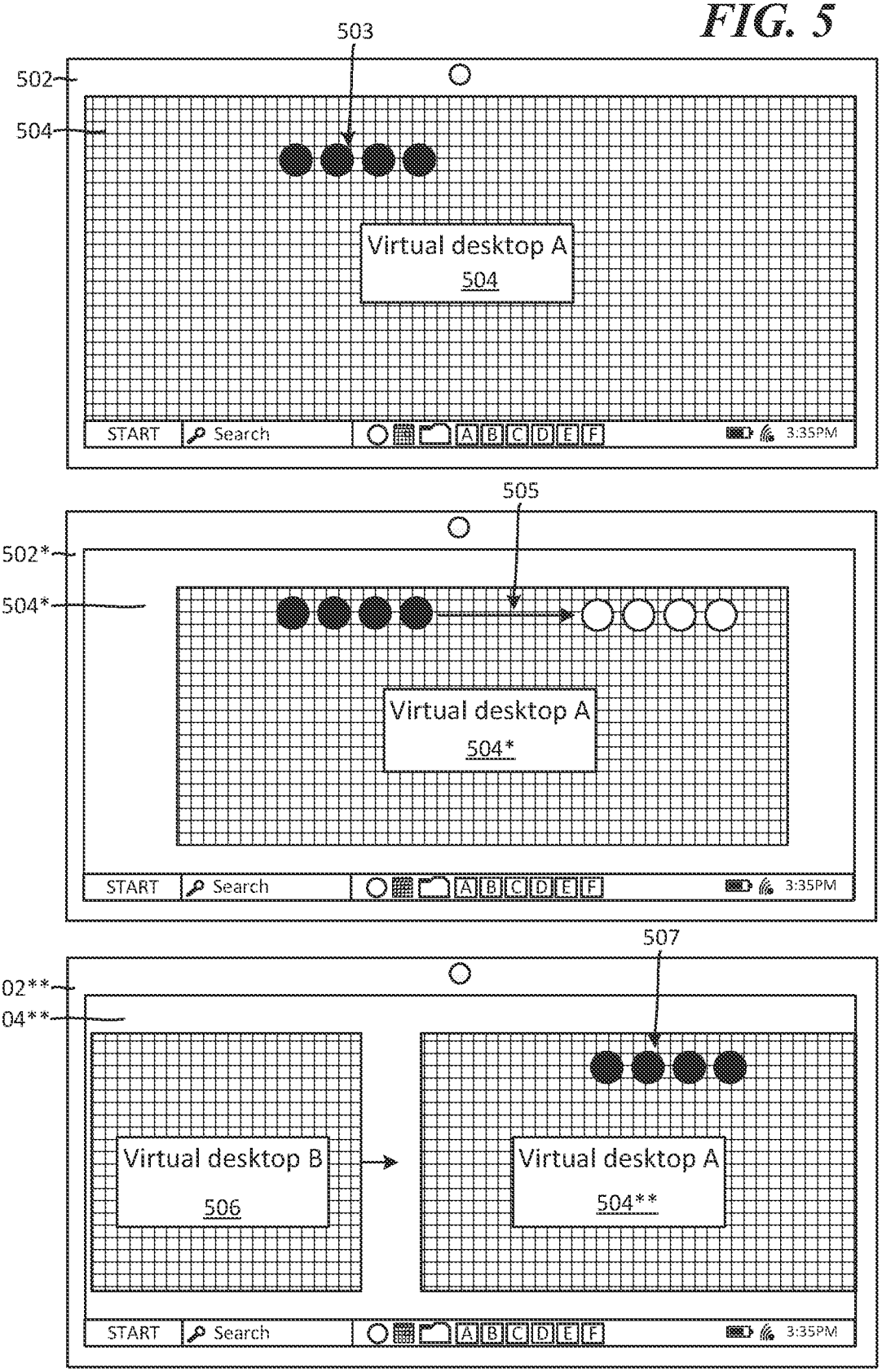
FIG. 5 illustrates the execution and display result of a virtual desktop transition gesture operation, which has been initiated via a touch input on a touchscreen.

FIG. 5 illustrates the execution and display result of a virtual desktop transition gesture operation (e.g., virtual desktop transition gesture operation 210), which has been initiated via a touch input on a touchscreen. FIG. 5 includes computing device 502, 502*, and 502**, which are all the same computing device, displaying the results of a virtual desktop gesture operation in an order in which they may occur (e.g., from computing device 502, to computing device 502*, to computing device 502**). Computing device 502 comprises a touchscreen computing device (e.g., the screen of computing device 502 can register touch inputs). In some examples, computing device 502 may comprise a laptop or other computing device that is connected to a touchpad. Computing device 502 may maintain a touchpad gesture manager comprising the identity of one or more touchpad gesture operations, and one or more conditions of execution for each touchpad gesture. Computing device 502 may additionally maintain a touchscreen gesture manager comprising an identity of one or more touchscreen gesture operations corresponding to the touchpad gesture operations, and one or more conditions of execution for each touchscreen gesture operation. In other examples, computing device 502 may comprise a computing device that is not connected to a touchpad, such as a tablet or smart phone. In still additional examples, computing device 502 may comprise a display that is connected to a computing device that executes a touchscreen gesture manager and/or a touchpad gesture manager.

Computing device 502 may maintain plurality of virtual desktops, and only one virtual desktop may be currently executed by computing device 502 at a given time. In this example, computing device 502 maintains first virtual desktop 504 (e.g., virtual desktop A) and second virtual desktop 506 (e.g., virtual desktop B). First virtual desktop 504 is being currently executed and displayed on computing device 502.

In this example, a four digit input is received on touchscreen 504, as indicated by first touch input 503. The receiving of the four digit input satisfies the first condition of the virtual desktop transition operation. It should be understood that in some examples, the first condition of the virtual desktop transition operation may comprise the receiving of a touchscreen input of more or fewer digits (e.g., three digits, five digits).

Upon receiving first touch input 503 computing device 502* modifies a display property of first virtual desktop 504, as illustrated by first virtual desktop 504*. In this specific example, the modification of the display property comprises rendering the desktop that is currently being executed and displayed in a smaller size. In some examples, the smaller sized virtual desktop may comprise a live or static rendering of the virtual desktop (e.g., a virtual desktop preview element). In other examples, the modification of the display property may comprise highlighting the virtual desktop, adding a border to the virtual desktop, and/or coloring the virtual desktop. Other modifications that indicate a further input may affect the virtual desktop that is currently being executed may be applied to the virtual desktop and are within the scope of this application. In some examples, upon receiving touch input 503 and modifying the display property of first virtual desktop 504, at least a portion of one or more other virtual desktops maintained by computing device 502 may be caused to be displayed. In some examples, displayed portions of the one or more other virtual desktops may comprise virtual desktop preview elements for the other virtual desktops, or portions of virtual desktop preview elements for the other virtual desktops.

In this example, subsequent to the virtual desktop being rendered in a smaller size, a lateral movement of the four digit input is received by touchscreen 504*, as indicated by second touch input 505. The lateral movement of the four digit input satisfies the second condition of the virtual desktop transition operation. In this example, second touch input 505 comprises a movement of the four digits on touchscreen 504* in the right direction. However, the second condition of the virtual desktop window transition operation may be satisfied by a lateral movement of the four digit input in the left direction.

Upon the fulfillment of the second condition of the virtual desktop transition operation, second virtual desktop 506 may be rendered and/or animated as being moved to the center of touchscreen 504, while first virtual desktop 504 may be rendered and/or animated as being moved outside and to the right of touchscreen 504. The rendering and/or animation may correspond to the lateral movement of the digits on touchscreen 504. For example, as the digits move from left to right, the virtual desktops (or virtual desktop preview elements) may also move from left to right.

Similarly, if the digits move from right to left, the virtual desktops (or virtual desktop preview elements) may also move from right to left.

In some examples, movement of the digits from left to right may cause virtual desktops to be consecutively surfaced in an order from most recently used to least recently used. In additional examples, movement of the digits from right to left may cause virtual desktops to be consecutively surfaced in an order from least recently used to most recently used.

In this example, the user has not lifted the digits from touchscreen 504 as illustrated by touch input 507. Thus, in this example, the virtual desktops are maintained in their modified display state due to the digits still being in contact with touchscreen 504. However, in other examples (not shown) the virtual desktops may be maintained in their modified display state even when the digits are removed from touchscreen 504**, until a subsequent input (e.g., touch input, mouse click) is received on one of the virtual desktops in their modified display state.

Figure 6:
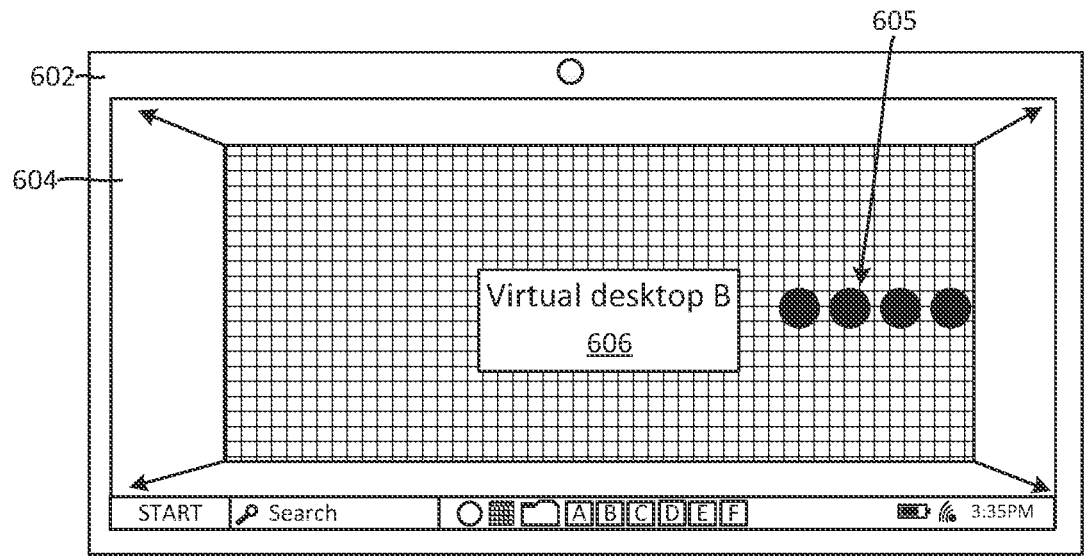
FIG. 6 illustrates the execution and display result of removal of the digits from the touchscreen of FIG. 4 after the second condition of the virtual desktop transition operation is satisfied.
Figure 6:
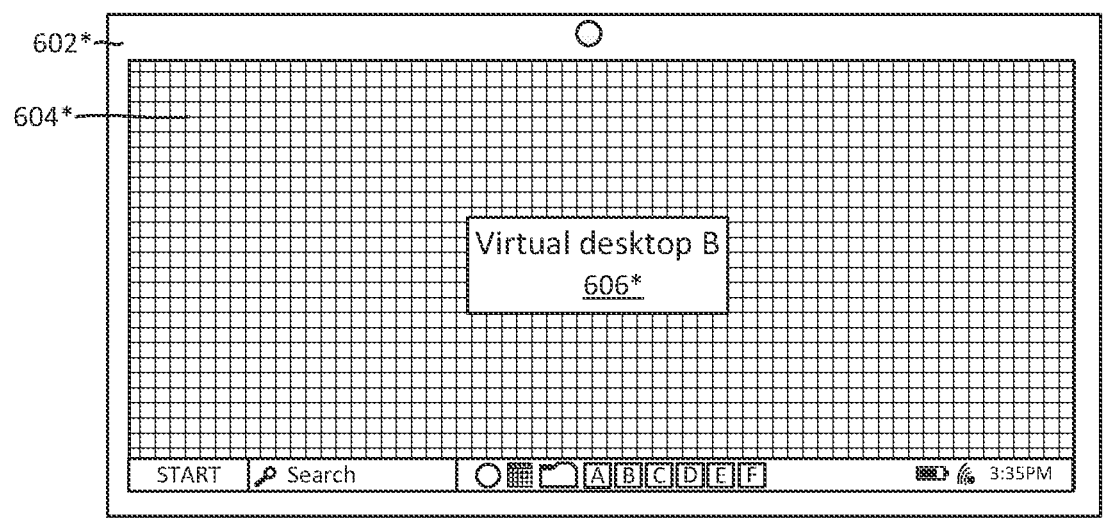

FIG. 6 illustrates the execution and display result of removal of the digits from the touchscreen of FIG. 4 after the second condition of the virtual desktop transition operation is satisfied. Specifically, computing device 602 and 602* are the same computing device as computing device 502, 502*, and 502**.

Second virtual desktop 606 (virtual desktop B) is displayed in its preview state on computing device 602. That is, the first and second conditions of the virtual desktop transition operation have been fulfilled, and the first virtual desktop preview element has been replaced by the second virtual desktop preview element. In this example, the four digit touch input has been maintained on touchscreen 604, as illustrated by touch input 605. Touch input 605 is subsequently removed from touchscreen 604, and virtual desktop B 606* is therefore caused to be maximized and executed by computing device 602*.

Figure 7:
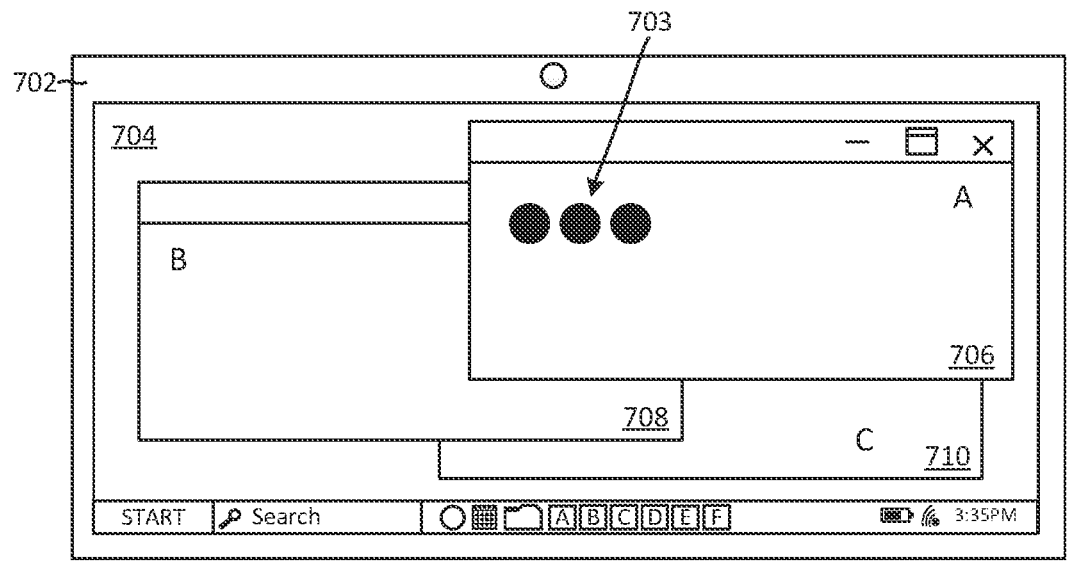
FIG. 7 illustrates the execution and display result of an application window minimizing gesture operation, which has been initiated via a touch input on a touchscreen.
Figure 7:
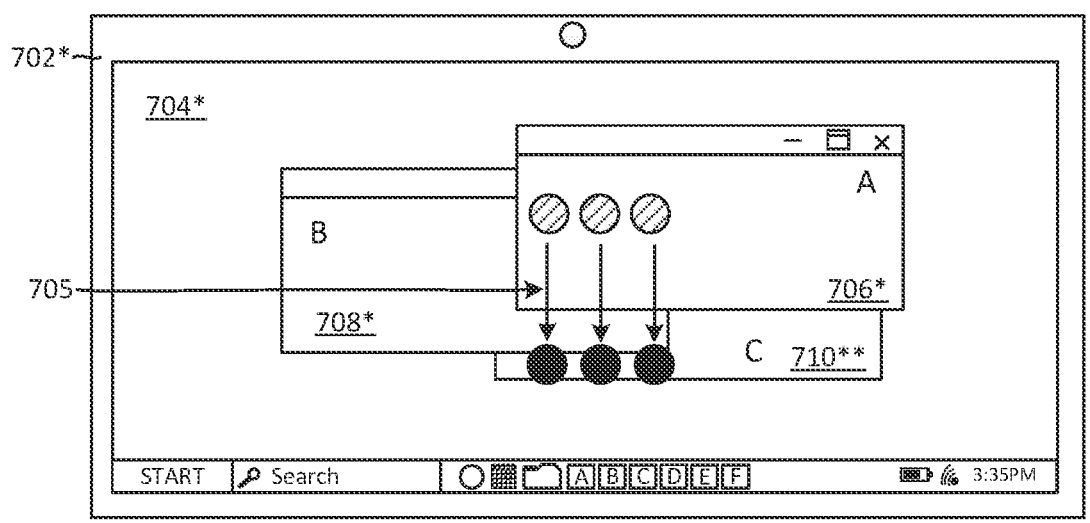
Figure 7:
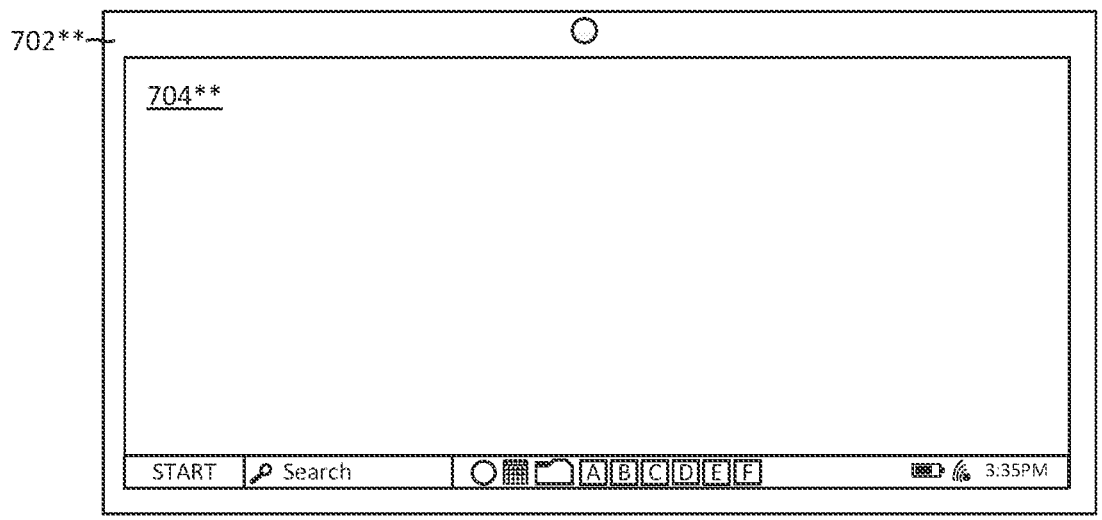

FIG. 7 illustrates the execution and display result of an application window minimizing gesture operation (e.g., application window minimizing gesture operation 216), which has been initiated via a touch input on a touchscreen. FIG. 7 includes computing device 702, 702*, and 702**, which are all the same computing device, displaying the results of an application window minimizing operation in an order in which they may occur (e.g., from computing device 702, to computing device 702*, to computing device 702**). Computing device 702 comprises a touchscreen computing device (e.g., the screen of computing device 702 can register touch inputs). In some examples, computing device 702 may comprise a laptop or other computing device that is connected to a touchpad. Computing device 702 may maintain a touchpad gesture manager comprising the identity of one or more touchpad gesture operations, and one or more conditions of execution for each touchpad gesture. Computing device 702 may additionally maintain a touchscreen gesture manager comprising an identity of one or more touchscreen gesture operations corresponding to the touchpad gesture operations, and one or more conditions of execution for each touchscreen gesture operation. In other examples, computing device 702 may comprise a computing device that is not connected to a touchpad, such as a tablet or smart phone. In still additional examples, computing device 702 may comprise a display that is connected to a computing device that executes a touchscreen gesture manager and/or a touchpad gesture manager.

Touchscreen 702 displays three application windows. Specifically, touchscreen 702 displays first application window 706, second application window 708, and third application window 710. In this example, touch input 703 is received on touchscreen 704. Touch input 703 may comprise an input of a number of digits. In this example, the number of digits is three digits. A determination may be made by touchscreen gesture manager 110 that the number of digits of touch input 703 meets the first condition of the application window minimization operation. In other examples, the number of digits needed to meet the first condition of the application window minimization operation may be more or less than three digits.

Upon determining that the number of digits meets the first condition of the application window minimization operation, computing device 702* modifies a display property of each of the open application windows (e.g., first application window 706*, second application window 708*, third application window 710*). In this specific example, the modification of the display property comprises rendering the open application windows in a smaller size. In some examples, the smaller sized application windows may comprise live or static renderings of the open application windows (e.g., application window preview elements). In other examples, modification of the display property may comprise highlighting the application windows, adding a border to the application windows, and/or coloring the application windows. Other modifications that indicate a further input may affect the open application windows may be applied to the application windows and are within the scope of this application.

In this example, subsequent to the application windows being rendered in a smaller size, downward vertical movement 705 of the three digit input is received by touchscreen 704*. Downward vertical movement 705 of the three digit input satisfies the second condition of the application window minimization operation.

Upon fulfillment of the second condition of the application window minimization operation, each of the application windows are automatically minimized and caused to no longer be displayed, as illustrated by computing device 702 and touchscreen 704.

Figure 8:
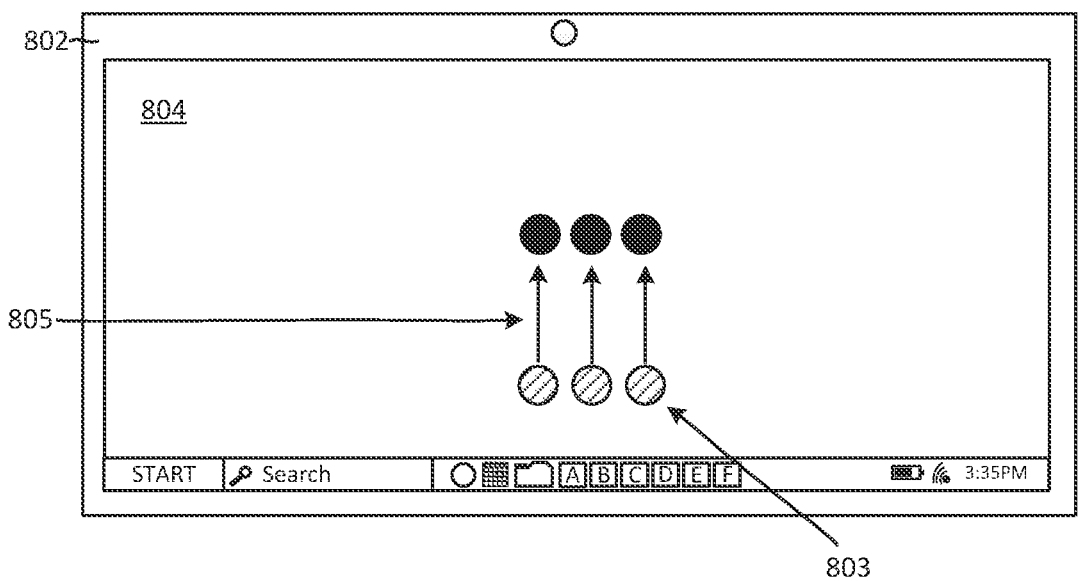
FIG. 8 illustrates the execution and display result of an application window restore gesture operation, which has been initiated via a touch input on a touchscreen.
Figure 8:
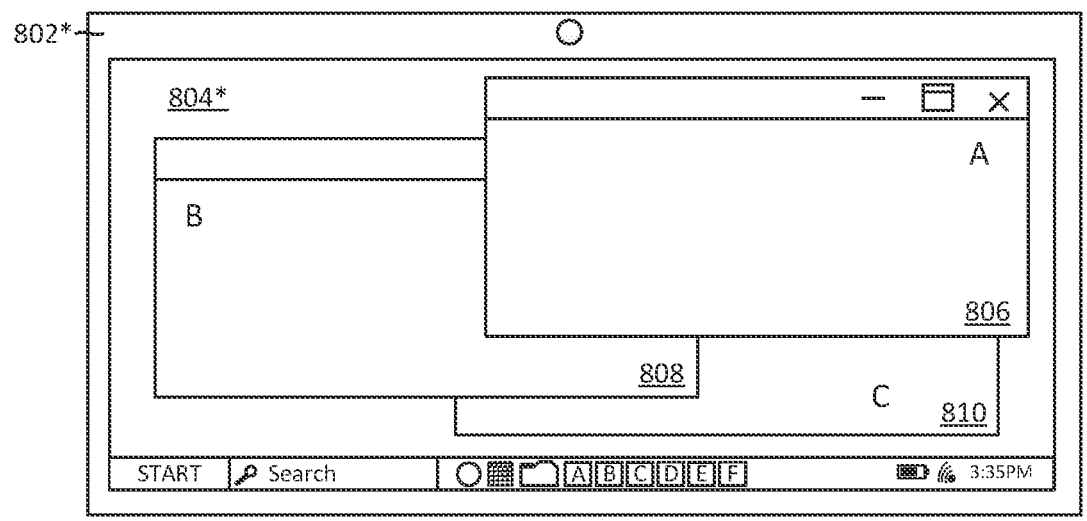

FIG. 8 illustrates the execution and display result of an application window restore gesture operation (application window restore operation 222), which has been initiated via a touch input on a touchscreen. FIG. 8 includes computing device 802 and computing device 802*, which are the same computing device as computing device 702, 702*, and 702**.

In this example, the three application windows are currently minimized on computing device 802. A first touch input 803 is received on touchscreen 804. First touch input 803 comprises a three digit input in this example. A determination may be made that first touch input 803, and specifically the number of digits of first touch input 803, fulfills the first condition of the application window restore operation. Although in this example, the number of digits needed to fulfill the first condition of the application window restore operation is three, more or fewer digits may be needed to fulfill the first condition in other examples.

Upward vertical movement 805 of the three digit input is then received by touchscreen 804. A determination may be made that upward vertical movement 805 fulfills the second condition of the application window restore operation. Upon determining that upward vertical movement 805 fulfills the second condition of the application window restore operation computing device 802* may cause the minimized application windows to be restored and/or displayed on touchscreen 804\*, as illustrated by first application window 806, second application window 808, and third application window 810.

According to examples, if an upward vertical three digit input is received and the application windows are not currently minimized (e.g., not minimized via the mechanisms described in relation to FIG. 7), application preview elements for each application window may be displayed. In some examples, if an upward vertical three digit input is received and the application windows are not currently minimized, application preview elements for each application window may be displayed in addition to displaying virtual desktop preview elements for one or more virtual desktops maintained by computing device 802. In still additional examples, a four finger upward vertical input may cause virtual desktop preview elements for one or more virtual desktops maintained by computing device 802 to be displayed.

Figure 9A:
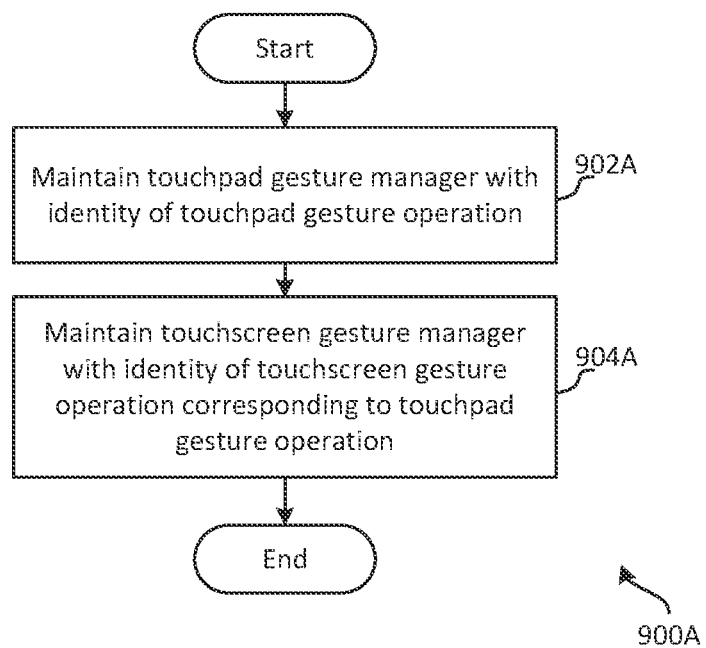
FIG. 9A is an exemplary method for assisting with gesture operations.

FIG. 9A is an exemplary method 900A for assisting with gesture operations. The method 900A begins at a start operation and flow moves to operation 902A.

At operation 902A a touchpad gesture manager is maintained. The touchpad gesture manager may comprise an identity of a touchpad gesture operation, a first condition of execution of the touchpad gesture operation, and a second condition of execution of the touchpad gesture operation. The first condition of execution of the touchpad gesture operation may comprise an input of a number of digits on a touchpad, and the second condition of execution of the touchpad gesture operation may comprise a movement type of the number of digits on the touchpad. In some examples, the movement type may comprise movement of the number of digits in a same direction (e.g., all digits concurrently moving in a same direction) on the touchpad.

From operation 902A flow continues to operation 904A where a touchscreen gesture manager is maintained. The touchscreen gesture manager may comprise an identity of a touchscreen gesture operation corresponding to the touchpad gesture operation, a first condition of execution of the touchscreen operation, and a second condition of execution of the touchscreen gesture operation. The first condition of execution of the touchscreen gesture operation may comprise an input of the number of digits (e.g., the same number of digits as needed to fulfill the first condition of execution of the touchpad gesture operation) on a touchscreen, and the second condition of execution of the touchscreen gesture operation may comprise the movement type of the number of digits (e.g., the same movement type and number of digits as need to fulfill the second condition of execution of the touchpad gesture operation) on the touchscreen.

According to examples, the touchpad gesture operation and the touchscreen gesture operation may comprise application window transition operations. In other examples, the touchpad gesture operation and the touchscreen gesture operation may comprise virtual desktop transition operations. In additional examples, the touchpad gesture operation and the touchscreen gesture operation may comprise application window minimization operations or application window restore operations. The touchpad gesture operation and/or the touchscreen gesture operation may comprise a plurality of intermediate operations that makeup the touchpad gesture operation and/or touchscreen gesture operation. For example, a first intermediate operation may comprise modifying a display property of one or more application windows or virtual desktops, and a second intermediate operation may comprise displaying an application window or application window preview element at a different order in a z-stack, or displaying a different virtual desktop or virtual desktop preview element.

From operation 904A flow moves to an end operation and the method 900A ends.

Figure 9B:
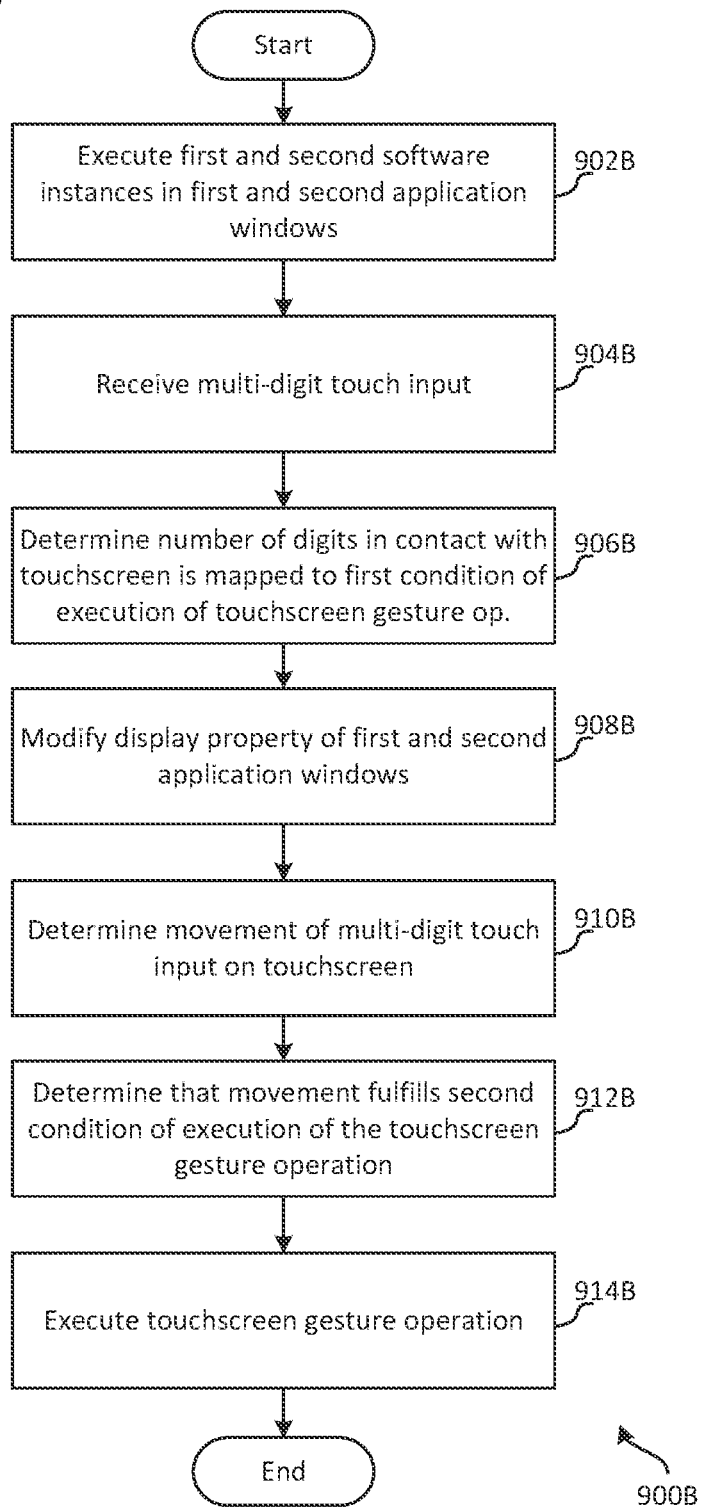
FIG. 9B is an exemplary method for executing an application window transition gesture operation.

FIG. 9B is an exemplary method 900B for executing an application window transition gesture operation. The method 900B begins at a start operation and the method moves to operation 902B.

At operation 902B a first software application instance is executed in a first application window and a second software application instance is executed in a second application window. The first application window may be displayed at a top of a z-order of a user interface displayed on a touchscreen. Thus, the first application window may be displayed at the foreground or closer to the foreground than the second application window.

From operation 902B flow continues to operation 904B where a multi-digit touch input is received by the touchscreen. The multi-digit touch input may comprise an input of two or more digits (e.g., two or more fingers, two or more conductive objects). In some examples, the multi-digit touch input may comprise an input of three digits. The multi-digit touch input comprises concurrent touching of the touchscreen by the multiple digits. In some examples, the z-order of each of the application windows may be saved to memory prior to or upon the multi-digit touch input being received.

From operation 904B flow continues to operation 906B where a determination is made that a number of digits that are in contact with the touchscreen is mapped to a first condition of execution of a touchscreen gesture operation. In some examples, the determination may comprise determining that the number of digits that are in contact with the touchscreen is mapped to a first condition of execution of any touchscreen gesture operation. In other examples, the determination may comprise determining that the number of digits that are in contact with the touchscreen is mapped to a first condition of execution of a specific touchscreen gesture operation (e.g., an application window transition gesture operation, a virtual desktop transition gesture operation).

From operation 906B flow continues to operation 908B where a display property of the first application window and the second application window is modified based on the determination that the number of digits that are in contact with the touchscreen is mapped to the first condition of the touchscreen gesture operation. Modifying the display property may comprise modifying the size of the first application window and the second application window, modifying one or more colors of the first application window and the second application window, adding a border to the first application window and the second application window, or highlighting the first application window and the second application window, for example. In some examples, modifying the display property of the first application window and the second application window may comprise replacing the first application window and the second application window with application window preview elements that comprises a live or static renderings of the first application window and the second application window.

From operation 908B flow continues to operation 910B where a determination of a movement of the multi-digit touch input on the touchscreen is made. That is, a determination that the multiple digits have moved on the touchscreen is made and a determination of a direction of movement is also made. In some examples, a determination may also be made as to how far in a specific direction the multiple digits have moved on the touchscreen.

From operation 910B flow continues to operation 912B where a determination is made that the movement fulfills a second condition of execution of the touchscreen gesture operation. In some examples, the second condition may comprise the receiving of a left or right lateral movement of the multiple digits. In other examples, the second condition may comprise the receiving of a left or right lateral movement of the multiple digits of more than a specified length.

From operation 912B flow continues to operation 914B where the touchscreen gesture operation is executed. The execution of the touchscreen gesture operation may comprise causing the second application window to be displayed at the top of the z-order of the user interface. In some examples, the digits may be removed from the touch screen, which may cause the first application window and the second application window to be returned to their non-modified state (e.g., no longer displayed in a smaller size, no longer highlighted, no longer displayed in a different color). In other examples, the first and second application windows may be returned to their non-modified state upon determining that the movement fulfilled the second condition of execution of the touchscreen gesture operation. touchpad From operation 914B flow moves to an end operation and the method 900B ends.

Figure 9C:
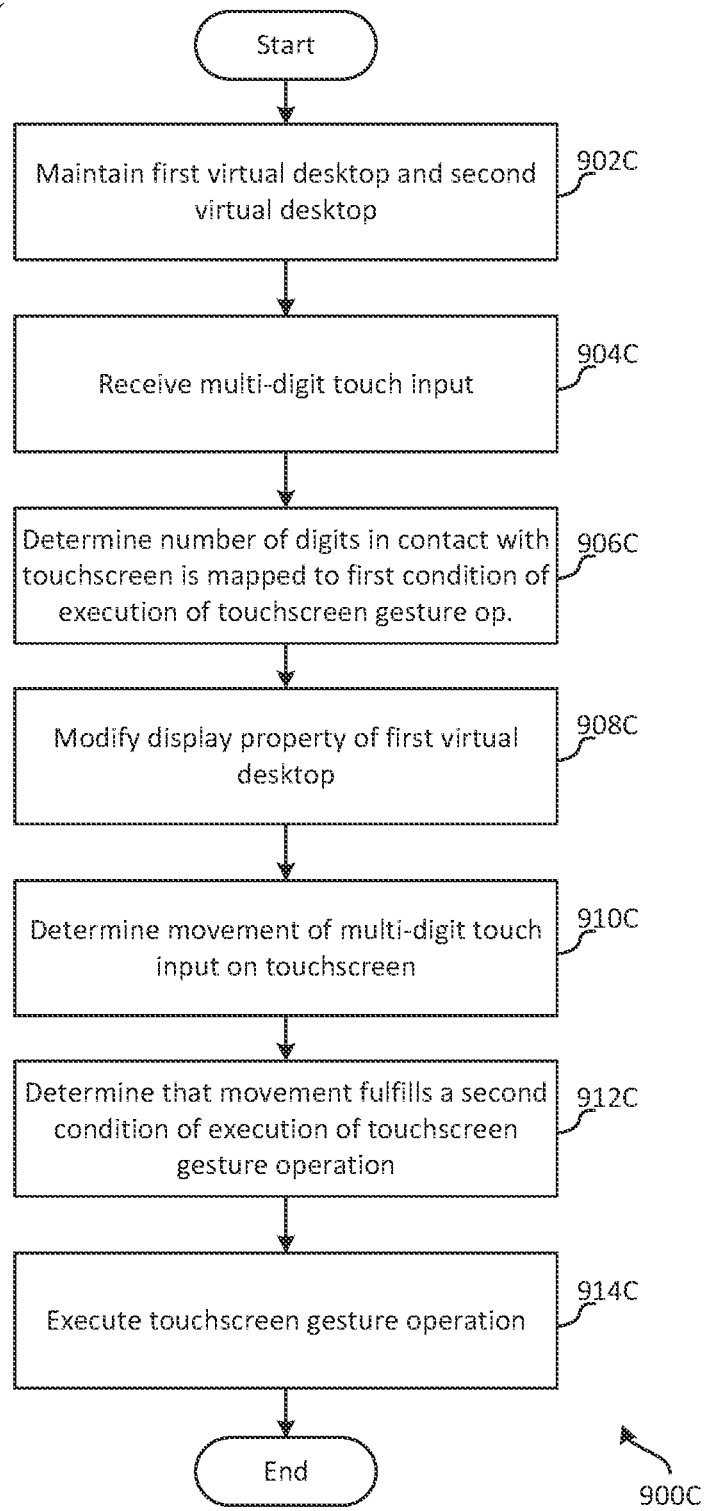
FIG. 9C is an exemplary method for executing a virtual desktop transition gesture operation.

FIG. 9C is an exemplary method 900C for executing a virtual desktop transition gesture operation. The method 900C begins at a start operation and flow moves to operation 902C.

At operation 902C a first virtual desktop and a second virtual desktop are maintained, and the first virtual desktop is currently displayed on a touchscreen. According to examples, only a single virtual desktop may be concurrently executed and displayed by the computing device that maintains the first virtual desktop and the second virtual desktop. The first virtual desktop and second virtual desktop may be associated with one or more users accounts. For example, a user account may create a first virtual desktop for work computing and a second virtual desktop for personal/home computing.

From operation 902C flow continues to operation 904C where a multi-digit touch input is received by the touchscreen. The multi-digit touch input may comprise an input of two or more digits (e.g., two or more fingers, two or more conductive objects). In some examples, the multi-digit touch input may comprise an input of four digits. The multi-digit touch input comprises concurrent touching of the touchscreen by the multiple digits.

From operation 904C flow continues to operation 906C where a determination is made that the number of digits that are in contact with the touchscreen is mapped to a first condition of execution of a touchscreen gesture operation. In some examples, the determination may comprise determining that the number of digits that are in contact with the touchscreen is mapped to a first condition of execution of any touchscreen gesture operation. In other examples, the determination may comprise determining that the number of digits that are in contact with the touchscreen is mapped to a first condition of execution of a specific touchscreen gesture operation (e.g., an application window transition gesture operation, a virtual desktop transition gesture operation).

From operation 906C flow continues to operation 908C where a display property of the first virtual desktop is modified based on the determination that the number of digits that are in contact with the touchscreen is mapped to the first condition of the touchscreen gesture operation. Modifying the display property may comprise modifying the size of the first virtual desktop, modifying one or more colors of the first virtual desktop, adding a border to the first virtual desktop, or highlighting the first virtual desktop, for example. In some examples, modifying the display property of the first virtual desktop may comprise replacing the first virtual desktop with a virtual desktop preview element that comprises a live or static rendering of the first virtual desktop.

From operation 908C flow continues to operation 910C where a determination of a movement of the multi-digit touch input on the touchscreen is made. That is, a determination that the multiple digits have moved on the touchscreen is made and a determination of a direction of movement is also made. In some examples, a determination may also be made as to how far in a specific direction the multiple digits have moved on the touchscreen.

From operation 910C flow continues to operation 912C where a determination is made that the movement fulfills a second condition of execution of the touchscreen gesture operation. In some examples, the second condition may comprise the receiving of a left or right lateral movement of the multiple digits. In other examples, the second condition may comprise the receiving of a left or right lateral movement of the multiple digits of more than a specified length.

From operation 912C flow continues to operation 914C where the touchscreen gesture operation is executed. Execution of the touchscreen gesture operation may comprise causing a preview element of the second virtual desktop to be currently displayed on the touchscreen. In some examples, upon receiving an indication that the number of digits are no longer in contact with the touchscreen, the second virtual desktop may be expanded and executed. In other examples, the preview element of the second virtual desktop may be maintained even when the number of digits are no longer in contact with the touchscreen, a selection may be made of the preview element of the second virtual desktop and the second virtual desktop may then be expanded and executed. The selection may comprise an input (e.g., mouse click, touchpad input, touchscreen input) on the preview element of the second virtual desktop.

From operation 914C flow moves to an end operation and the method 900C ends.

Figure 10:
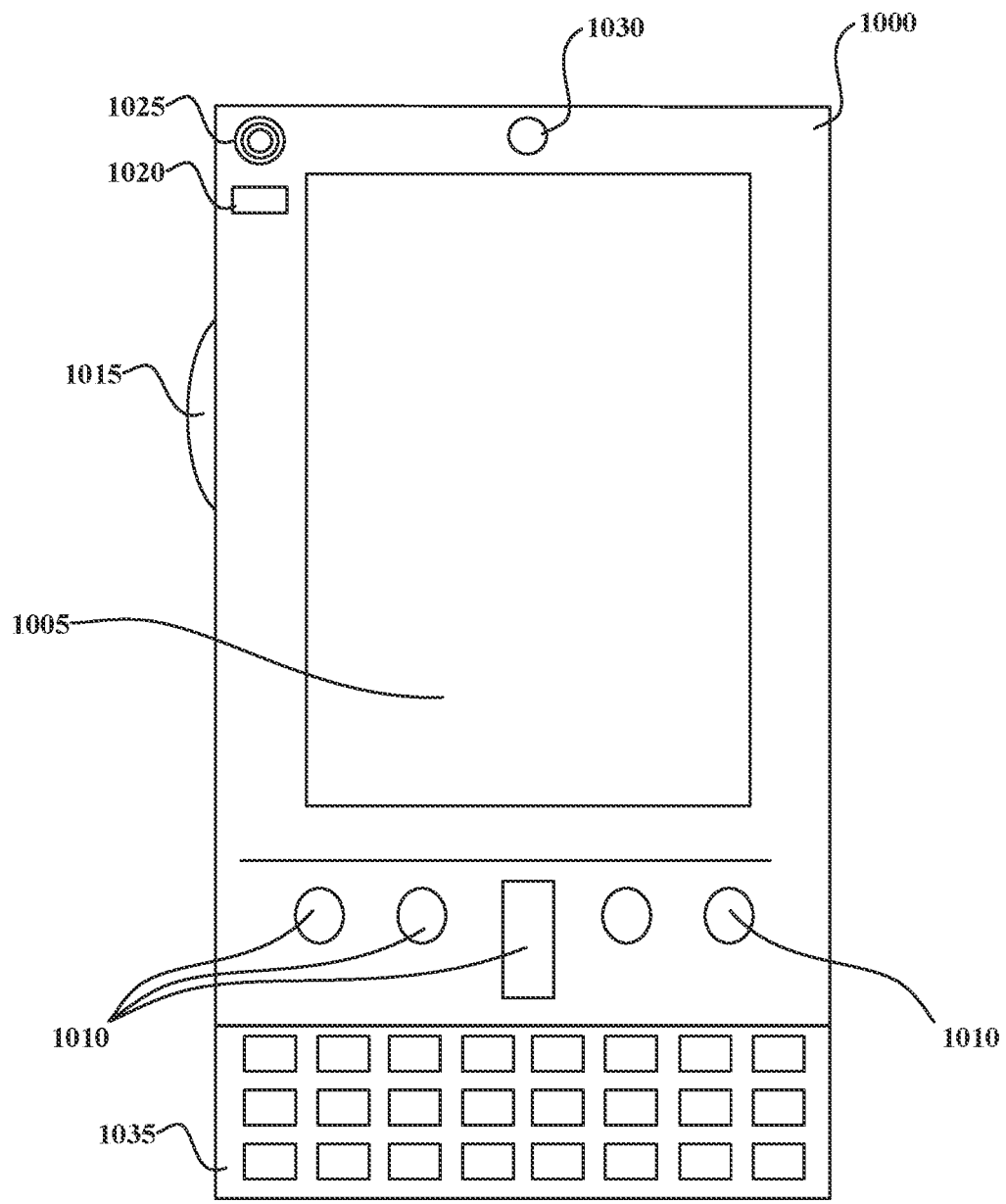
FIGS. 10 and 11 are simplified diagrams of a mobile computing device with which aspects of the disclosure may be practiced.
Figure 11:
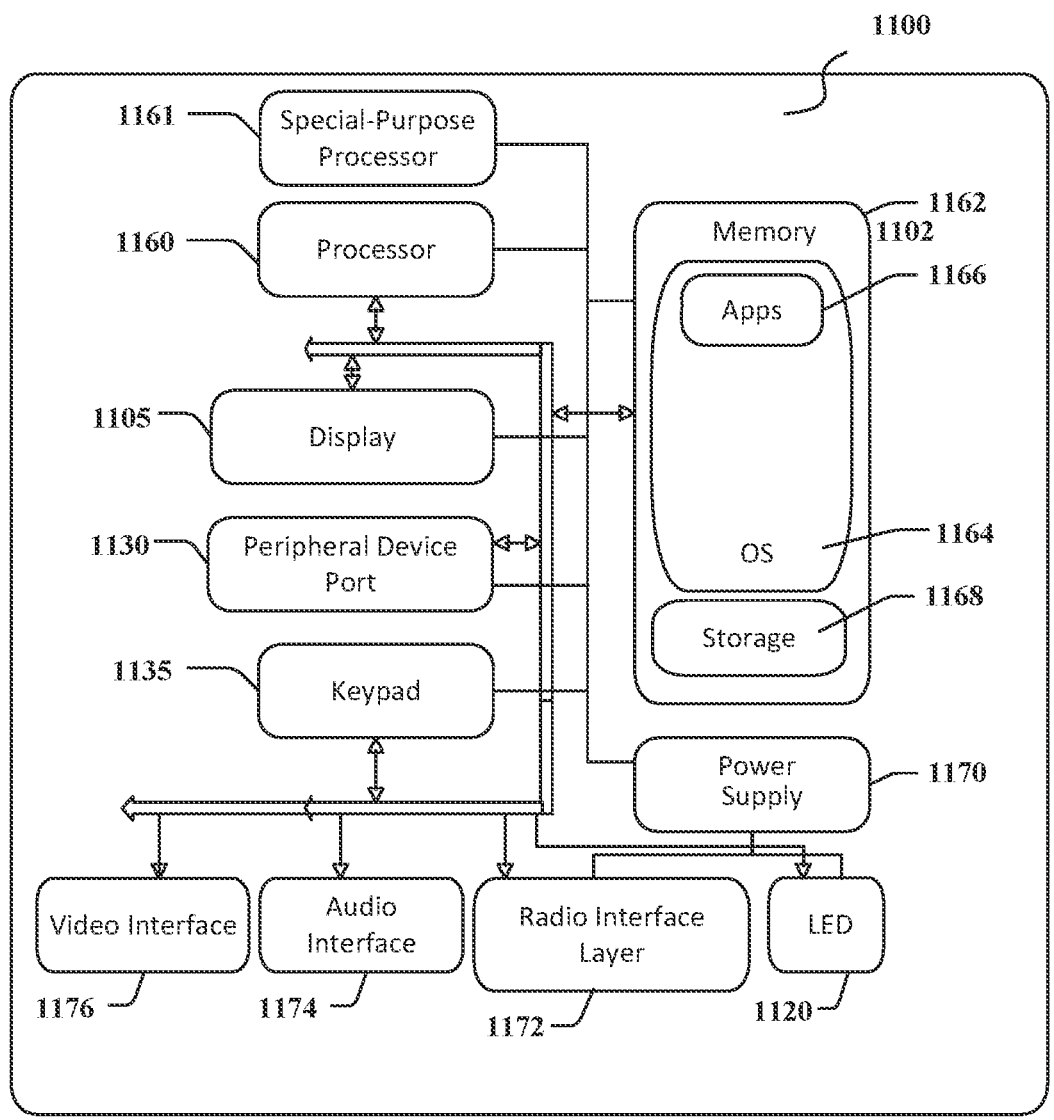

FIGS. 10 and 11 illustrate a mobile computing device 1000, for example, a mobile telephone, a smart phone, wearable computer (such as smart eyeglasses), a tablet computer, an e-reader, a laptop computer, or other AR compatible computing device, with which embodiments of the disclosure may be practiced. With reference to FIG. 10, one aspect of a mobile computing device 1000 for implementing the aspects is illustrated. In a basic configuration, the mobile computing device 1000 is a handheld computer having both input elements and output elements. The mobile computing device 1000 typically includes a display 1005 and one or more input buttons 1010 that allow the user to enter information into the mobile computing device 1000. The display 1005 of the mobile computing device 1000 may also function as an input device (e.g., a touch screen display). If included, an optional side input element 1015 allows further user input. The side input element 1015 may be a rotary switch, a button, or any other type of manual input element. In alternative aspects, mobile computing device 1000 may incorporate more or fewer input elements. For example, the display 1005 may not be a touch screen in some embodiments. In yet another alternative embodiment, the mobile computing device 1000 is a portable phone system, such as a cellular phone. The mobile computing device 1000 may also include an optional keypad 1035.

Optional keypad 1035 may be a physical keypad or a "soft" keypad generated on the touch screen display. In various embodiments, the output elements include the display 1005 for showing a graphical user interface (GUI), a visual indicator 1020 (e.g., a light emitting diode), and/or an audio transducer 1025 (e.g., a speaker). In some aspects, the mobile computing device 1000 incorporates a vibration transducer for providing the user with tactile feedback. In yet another aspect, the mobile computing device 1000 incorporates input and/or output ports, such as an audio input (e.g., a microphone jack), an audio output (e.g., a headphone jack), and a video output (e.g., a HDMI port) for sending signals to or receiving signals from an external device.

FIG. 11 is a block diagram illustrating the architecture of one aspect of a mobile computing device. That is, the mobile computing device 1100 can incorporate a system (e.g., an architecture) 1102 to implement some aspects. In one embodiment, the system 1102 is implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100, including instructions for providing and operating an asset disposition engine.

The system 1102 has a power supply 1170, which may be implemented as one or more batteries. The power supply 1170 might further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1020 may be used to provide visual notifications, and/or an audio interface 1174 may be used for producing audible notifications via the audio transducer 1025. In the illustrated embodiment, the visual indicator 1020 is a light emitting diode (LED) and the audio transducer 1025 is a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1025, the audio interface 1174 may also be coupled to a microphone to receive audible input, such as to facilitate a telephone conversation. In accordance with embodiments of the present disclosure, the microphone may also serve as an audio sensor to facilitate control of notifications, as will be described below. The system 1102 may further include a video interface 1176 that enables an operation of an on-board camera 1030 to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11 by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

Figure 12:
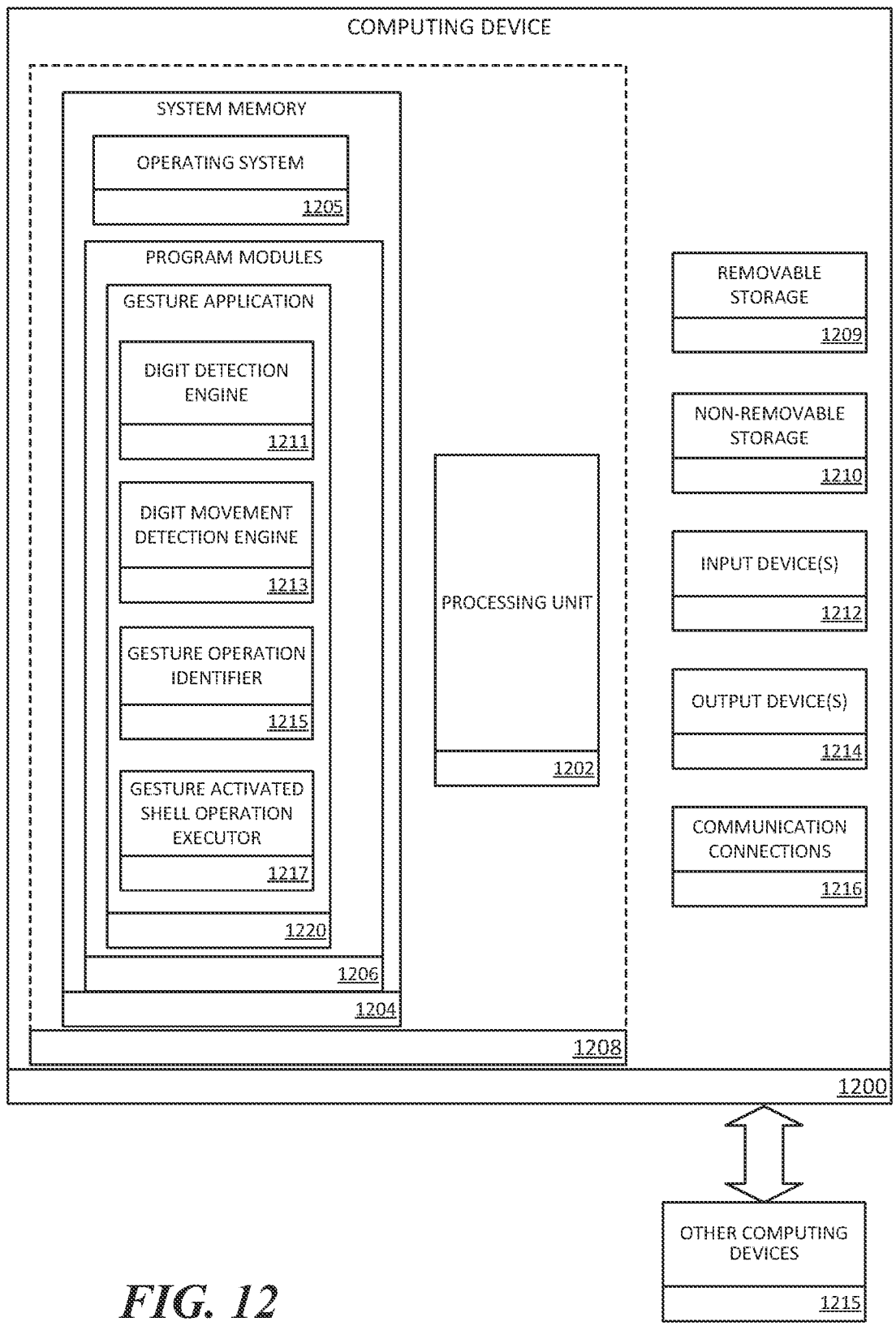
FIG. 12 is a block diagram illustrating example physical components of a computing device with which aspects of the disclosure may be practiced.

FIG. 12 is a block diagram illustrating physical components (e.g., hardware) of a computing device 1200 with which aspects of the disclosure may be practiced. The computing device components described below may have computer executable instructions for executing touchscreen gestures that have same conditions as their touchpad counterparts. In a basic configuration, the computing device 1200 may include at least one processing unit 1202 and a system memory 1204. Depending on the configuration and type of computing device, the system memory 1204 may comprise, but is not limited to, volatile storage (e.g., random access memory), non-volatile storage (e.g., read-only memory), flash memory, or any combination of such memories. The system memory 1204 may include an operating system 1205 suitable for running one or more software applications. The operating system 1205, for example, may be suitable for controlling the operation of the computing device 1200. Furthermore, embodiments of the disclosure may be practiced in conjunction with a graphics library, other operating systems, or any other application program and is not limited to any particular application or system. This basic configuration is illustrated in FIG. 12 by those components within a dashed line 1208. The computing device 1200 may have additional features or functionality. For example, the computing device 1200 may also include additional data storage devices (removable and/or non-removable) such as, for example, magnetic disks, optical disks, or tape. Such additional storage is illustrated in FIG. 12 by a removable storage device 1209 and a non-removable storage device 1210.

As stated above, a number of program modules and data files may be stored in the system memory 1204. While executing on the processing unit 1202, the program modules 1206 (e.g., gesture application 1220) may perform processes including, but not limited to, the aspects, as described herein. Digit detection engine 1211 may determine whether one or more digits are in contact with a touchscreen or touchpad, and determine a number of digits that are in contact with a touchscreen or touchpad. Digit movement detection engine 1213 may determine a direction of travel of one or more digits on a touchscreen or touchpad, a length of travel of one or more digits on a touchscreen or touchpad, and/or a speed of travel of one or more digits on a touchscreen or touchpad. Gesture operation identifier 1215 may determine whether one or more conditions of a gesture operations have been satisfied. Gesture activated shell operation executor 1217 may receive an indication that one or more conditions of a gesture operation have been satisfied, and cause one or more shell actions corresponding to the gesture operation to be executed based on that indication.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 12 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1200 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1200 may also have one or more input device(s) 1212 such as a keyboard, a mouse, a pen, a sound or voice input device, a touch or swipe input device, etc. The output device(s) 1214 such as a display, speakers, a printer, etc. may also be included. The aforementioned devices are examples and others may be used. The computing device 1200 may include one or more communication connections 1216 allowing communications with other computing devices 1215. Examples of suitable communication connections 1216 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1204, the removable storage device 1209, and the non-removable storage device 1210 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1200. Any such computer storage media may be part of the computing device 1200. Computer readable media and computer storage media as described herein does not include transitory media such as a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 13:
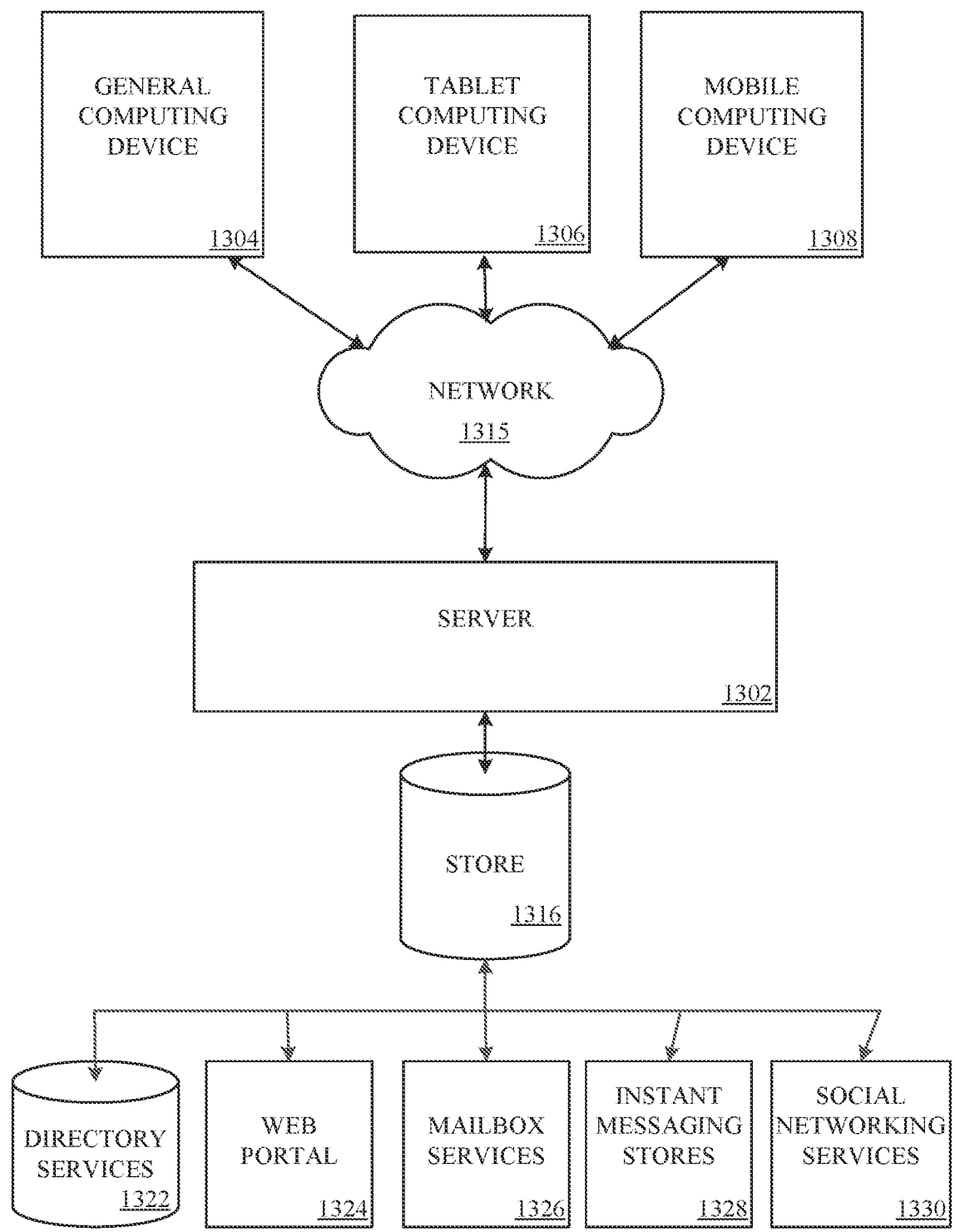
FIG. 13 is a simplified block diagram of a distributed computing system in which aspects of the present disclosure may be practiced.

FIG. 13 illustrates one aspect of the architecture of a system for processing data received at a computing system from a remote source, such as a personal/general computer 1304, tablet computing device 1306, or mobile computing device 1308, as described above. Content displayed at server device 1302 may be stored in different communication channels or other storage types. For example, various documents may be stored using a directory service 1322, a web portal 1324, a mailbox service 1326, an instant messaging store 1328, or a social networking site 1330. The program modules 1306 may be employed by a client that communicates with server device 1302, and/or the program modules 1206 may be employed by server device 1302. The server device 1302 may provide data to and from a client computing device such as a personal/general computer 1304, a tablet computing device 1306 and/or a mobile computing device 1308 (e.g., a smart phone) through a network 1315. By way of example, the computer system described above may be embodied in a personal/general computer 1304, a tablet computing device 1306 and/or a mobile computing device 1308 (e.g., a smart phone). Any of these embodiments of the computing devices may obtain content from the store 1316, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure. The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method comprising:
   executing a first software application instance in a first application window and a second software application instance in a second application window, wherein the first application window is displayed at a top of a z-order of a user interface displayed on a touchscreen;
   receiving, by the touchscreen, a multi-digit touch input;
   determining that a number of digits that are in contact with the touchscreen is mapped to a first condition of execution of a touchscreen gesture operation;
   modifying, based on the determination that the number of digits that are in contact with the touchscreen is mapped to the first condition of the touchscreen gesture operation, a display property of the first application window and the second application window;
   determining a movement of the multi-digit touch input on the touchscreen;
   determining that the movement fulfills a second condition of execution of the touchscreen gesture operation;
   determining that there is a corresponding touchpad gesture operation to the touchscreen gesture operation;
   identifying a joint shell operation for execution of the touchscreen gesture operation and the corresponding touchpad gesture operation;
   identifying differing operation elements corresponding to the joint shell operation for execution of the touchscreen gesture operation, wherein the differing operation elements execute differently for the touchscreen gesture operation than for the corresponding touchpad gesture operation; and
   executing the touchscreen gesture operation using the joint shell operation and the differing operation elements, wherein execution of the touchscreen gesture operation comprises causing the second application window to be displayed at the top of the z-order of the user interface.

2. The computer-implemented method of claim 1, wherein modifying the display property of the first application window and the second application window comprises modifying a size of the first application window and a size of the second application window.

3. The computer-implemented method of claim 1, further comprising:
   determining that the multi-digit touch input is no longer being received; and
   causing, based on the determination that the multi-digit touch input is no longer being received, the modified display property of the first application window and the second application window to no longer be modified.

4. The computer-implemented method of claim 1, wherein modifying the display property of the first application window and the second application window comprises modifying a color of the first application window and a color of the second application window.

5. The computer-implemented method of claim 1, further comprising:
   determining that the multi-digit touch input is no longer in contact with the touchscreen; and
   maintaining the modified display property of the first application window and the modified display property of the second application window.

6. The computer-implemented method of claim 5, further comprising:
   receiving a touch input at the second application window; and
   causing the second application window to be restored at a foreground of the user interface.

7. The computer-implemented method of claim 5, wherein there is a third software application instance executed in a third application window, and wherein the method further comprises:
   receiving, by the touchscreen, a second multi-digit touch input;
   determining a movement of the second multi-digit touch input on the touchscreen;
   determining that the movement of the second multi-digit touch input on the touchscreen fulfills the second condition of the touchscreen gesture operation; and
   executing the touchscreen gesture operation again, wherein execution of the touchscreen gesture operation again comprises causing the third application window to be displayed at the top of the z-order of the user interface.

8. The computer-implemented method of claim 1, wherein receiving an input of the number of digits, on a touchpad connected to a computing device executing the first software application instance and the second software application instance, is mapped to a first condition of execution of a touchpad gesture operation for surfacing application preview elements.

9. The computer-implemented method of claim 8, wherein receiving a movement of the number of digits, on the touchpad, is mapped to a second condition of execution of the touchpad gesture operation for surfacing application preview elements.

10. A computer-readable media comprising executable instructions that, upon execution by a processor, cause the processor to:
    execute a first software application instance in a first application window and a second software application instance in a second application window, wherein the first application window is displayed at a top of a z-order of a user interface displayed on a touchscreen;

receive, via the touchscreen, a multi-digit touch input;
determine that a number of digits that are in contact with the touchscreen is mapped to a first condition of execution of a touchscreen gesture operation;
modify, based on the determination that the number of digits that are in contact with the touchscreen is mapped to the first condition of the touchscreen gesture operation, a display property of the first application window and the second application window;
determine a movement of the multi-digit touch input on the touchscreen;
determine that the movement fulfills a second condition of execution of the touchscreen gesture operation;
determine that there is a corresponding touchpad gesture operation to the touchscreen gesture operation;
identify a joint shell operation for execution of the touchscreen gesture operation and the corresponding touchpad gesture operation;
identify differing operation elements corresponding to the joint shell operation for execution of the touchscreen gesture operation, wherein the differing operation elements execute differently for the touchscreen gesture operation than for the corresponding touchpad gesture operation; and
execute the touchscreen gesture operation using the joint shell operation and the differing operation elements, wherein execution of the touchscreen gesture operation comprises causing the second application window to be displayed at the top of the z-order of the user interface.

11. The computer-readable media of claim 10, wherein the executable instructions to modify the display property of the first application window and the second application window comprise further executable instructions that, upon execution by the processor, cause the processor to:
modify a size of the first application window and a size of the second application window.

12. The computer-readable media of claim 10, wherein the executable instructions comprise further executable instructions that, upon execution by the processor, cause the processor to:
determine that the multi-digit touch input is no longer being received; and
cause, based on the determination that the multi-digit touch input is no longer being received, the modified display property of the first application window and the second application window to no longer be modified.

13. The computer-readable media of claim 10, wherein the executable instructions to modify the display property of the first application window and the second application window comprise further executable instructions that, upon execution by the processor, cause the processor to:
modify a color of the first application window and a color of the second application window.

14. The computer-readable media of claim 10, wherein the executable instructions comprise further executable instructions that, upon execution by the processor, cause the processor to:
determine that the multi-digit touch input is no longer in contact with the touchscreen; and
maintain the modified display property of the first application window and the modified display property of the second application window.

15. The computer-readable media of claim 14, wherein the executable instructions comprise further executable instructions that, upon execution by the processor, cause the processor to:
receive a touch input at the second application window; and
cause the second application window to be restored at a foreground of the user interface.

16. The computer-readable media of claim 14, wherein there is a third software application instance executed in a third application window, and wherein the executable instructions comprise further executable instructions that, upon execution by the processor, cause the processor to:
receive, via the touchscreen, a second multi-digit touch input;
determine a movement of the second multi-digit touch input on the touchscreen;
determine that the movement of the second multi-digit touch input on the touchscreen fulfills the second condition of the touchscreen gesture operation; and
execute the touchscreen gesture operation again, wherein execution of the touchscreen gesture operation again comprises causing the third application window to be displayed at the top of the z-order of the user interface.

17. The computer-readable media of claim 10, wherein receiving an input of the number of digits, on a touchpad connected to a computing device executing the first software application instance and the second software application instance, is mapped to a first condition of execution of a touchpad gesture operation for surfacing application preview elements.

18. The computer-readable media of claim 17, wherein receiving a movement of the number of digits, on the touchpad, is mapped to a second condition of execution of the touchpad gesture operation for surfacing application preview elements.

19. A system comprising:
a touchscreen;
a touchpad distinct from the touchscreen;
a processor; and
a memory, functionally coupled to the processor, the memory having stored thereon instructions that, upon execution by the processor, cause the processor to:
execute a first software application instance in a first application window and a second software application instance in a second application window, wherein the first application window is displayed at a top of a z-order of a user interface displayed on a touchscreen;
receive, via the touchscreen, a multi-digit touch input;
determine that a number of digits that are in contact with the touchscreen is mapped to a first condition of execution of a touchscreen gesture operation;
modify, based on the determination that the number of digits that are in contact with the touchscreen is mapped to the first condition of the touchscreen gesture operation, a display property of the first application window and the second application window;
determine a movement of the multi-digit touch input on the touchscreen;
determine that the movement fulfills a second condition of execution of the touchscreen gesture operation;
determine that there is a corresponding touchpad gesture operation to the touchscreen gesture operation;
identify a joint shell operation for execution of the touchscreen gesture operation and the corresponding touchpad gesture operation;
identify differing operation elements corresponding to the joint shell operation for execution of the touchscreen gesture operation, wherein the differing operation elements execute differently for the touchscreen gesture operation than for the corresponding touchpad gesture operation; and execute the touchscreen gesture operation using the joint shell operation and the differing operation elements, wherein execution of the touchscreen gesture operation comprises causing the second application window to be displayed at the top of the z-order of the user interface.

20. The system of claim 19, wherein the instructions to modify the display property of the first application window and the second application window comprise further instructions that, upon execution by the processor, cause the processor to:

modify a size of the first application window and a size of the second application window.

\* \* \* \* \*